United States Patent
Okita

(10) Patent No.: US 10,831,069 B2
(45) Date of Patent: Nov. 10, 2020

(54) DISPLAY DEVICE

(71) Applicant: Japan Display Inc., Minato-ku (JP)

(72) Inventor: Mitsutaka Okita, Tokyo (JP)

(73) Assignee: Japan Display Inc., Minato-ku (JP)

( * ) Notice: Subject to any disclaimer, the term of this patent is extended or adjusted under 35 U.S.C. 154(b) by 186 days.

(21) Appl. No.: 15/947,324

(22) Filed: Apr. 6, 2018

(65) Prior Publication Data

US 2018/0348555 A1    Dec. 6, 2018

(30) Foreign Application Priority Data

May 30, 2017   (JP) .................. 2017-107018

(51) Int. Cl.
  *G02F 1/1339*   (2006.01)
  *G02F 1/1335*   (2006.01)
  *G02F 1/1343*   (2006.01)
  *G02F 1/1362*   (2006.01)
  *G02F 1/1333*   (2006.01)

(52) U.S. Cl.
  CPC .......... *G02F 1/1339* (2013.01); *G02F 1/1343* (2013.01); *G02F 1/13394* (2013.01); *G02F 1/133305* (2013.01); *G02F 1/133514* (2013.01); *G02F 1/136286* (2013.01); *G02F 2001/13396* (2013.01)

(58) Field of Classification Search
  None
  See application file for complete search history.

(56) References Cited

U.S. PATENT DOCUMENTS

| | | | |
|---|---|---|---|
| 7,362,404 B2 * | 4/2008 | Tadaki ................ | G02F 1/1339 349/153 |
| 2007/0216848 A1 * | 9/2007 | Huang ................ | G02F 1/1341 349/155 |
| 2013/0155367 A1 | 6/2013 | Tomioka et al. | |
| 2014/0111746 A1 * | 4/2014 | Kim ................ | G02F 1/133377 349/106 |
| 2016/0097947 A1 | 4/2016 | Tomioka et al. | |
| 2017/0115525 A1 | 4/2017 | Okita | |
| 2017/0322442 A1 | 11/2017 | Tomioka et al. | |

FOREIGN PATENT DOCUMENTS

JP   2013-127563   6/2013
JP   2017-83614    5/2017

* cited by examiner

*Primary Examiner* — Edward J Glick
*Assistant Examiner* — David Y Chung
(74) *Attorney, Agent, or Firm* — Oblon, McClelland, Maier & Neustadt, L.L.P.

(57) ABSTRACT

According to one embodiment, a display device comprises a first A spacer, a second A spacer, a third A spacer and a fourth A spacer. The first A spacer and the third A spacer are on a first substrate. The second A spacer and the fourth A spacer are on a second substrate. At least one of the first and second substrates is a flexible substrate. The first A spacer and the second A spacer are aligned in a first direction. The third A spacer and the fourth A spacer are aligned in a second direction. Side surfaces of the first A spacer and the second A spacer face in the first direction. Side surfaces of the third A spacer and the fourth A spacer face in the second direction.

16 Claims, 18 Drawing Sheets

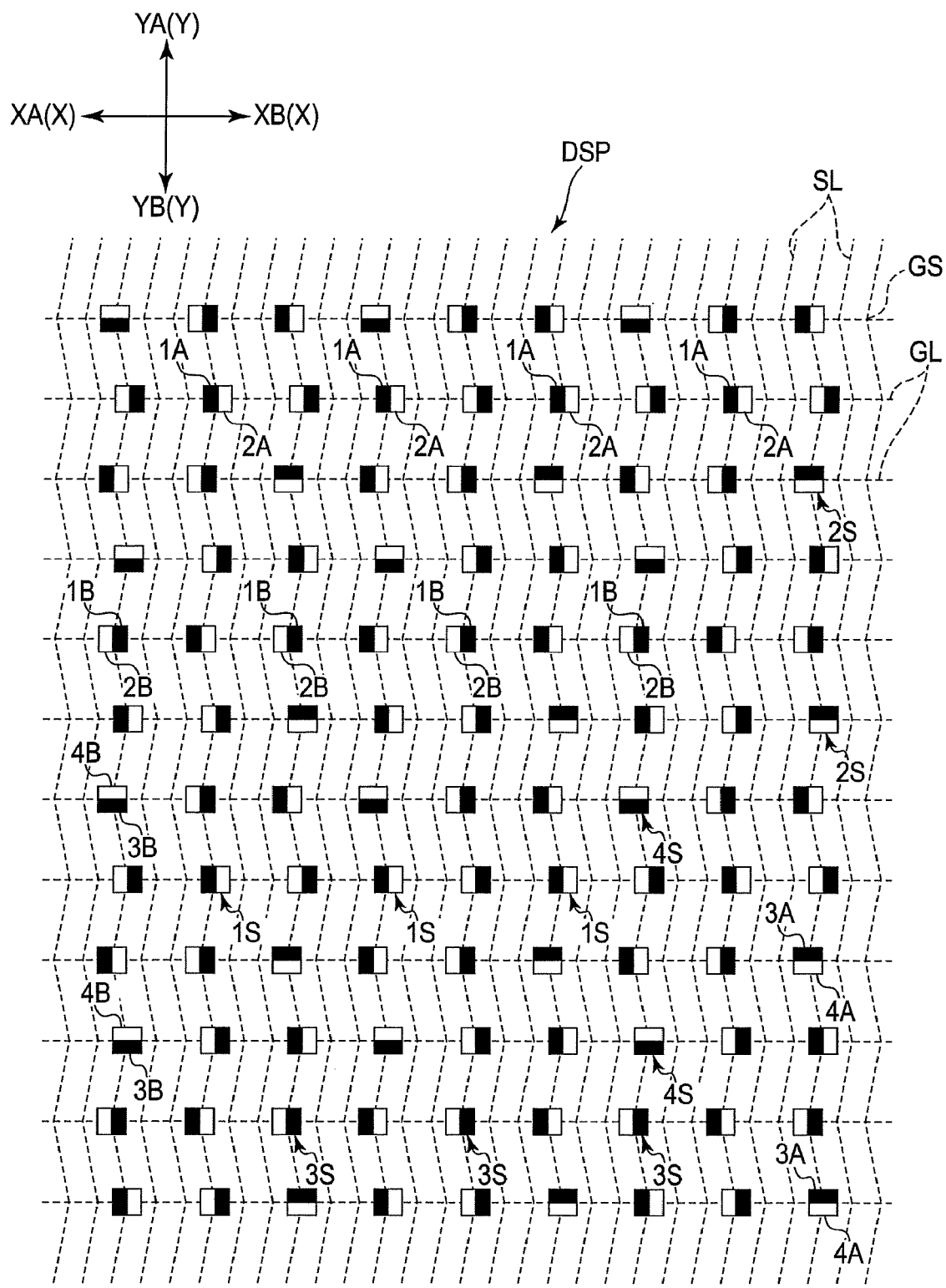
F I G. 4

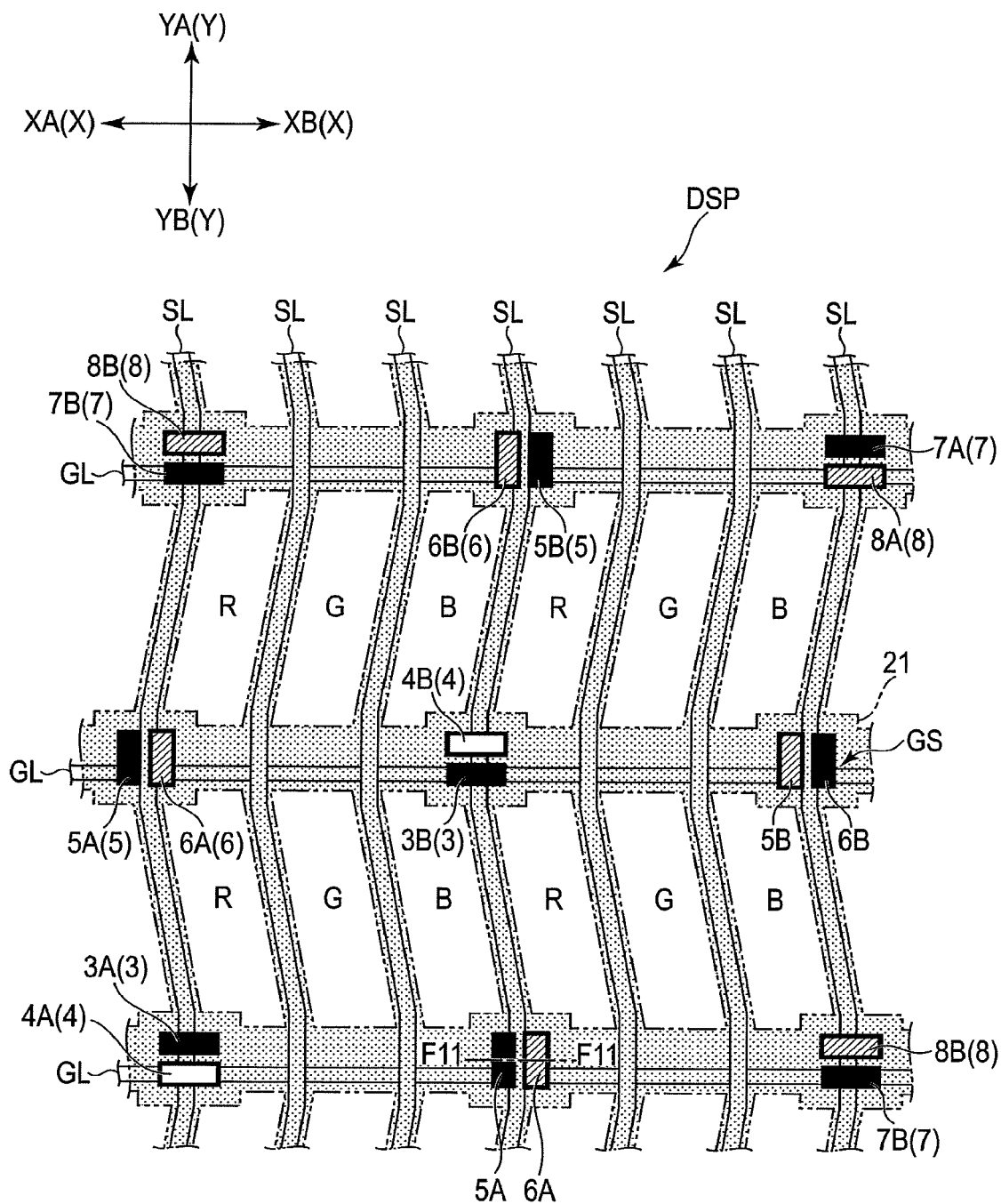
F I G. 10

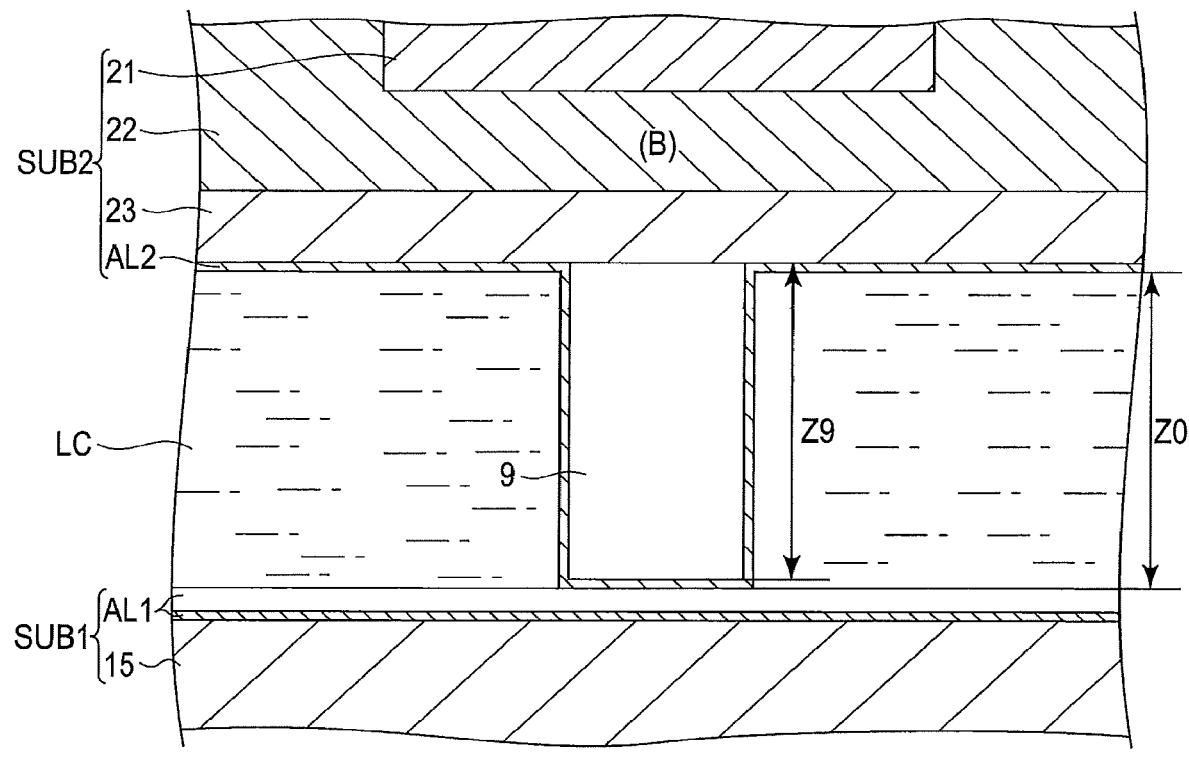
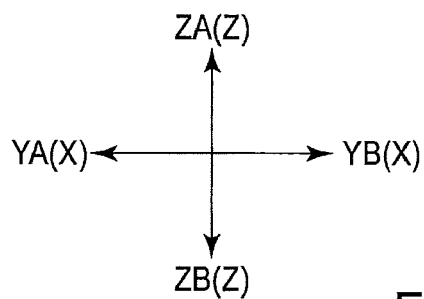
F I G. 13

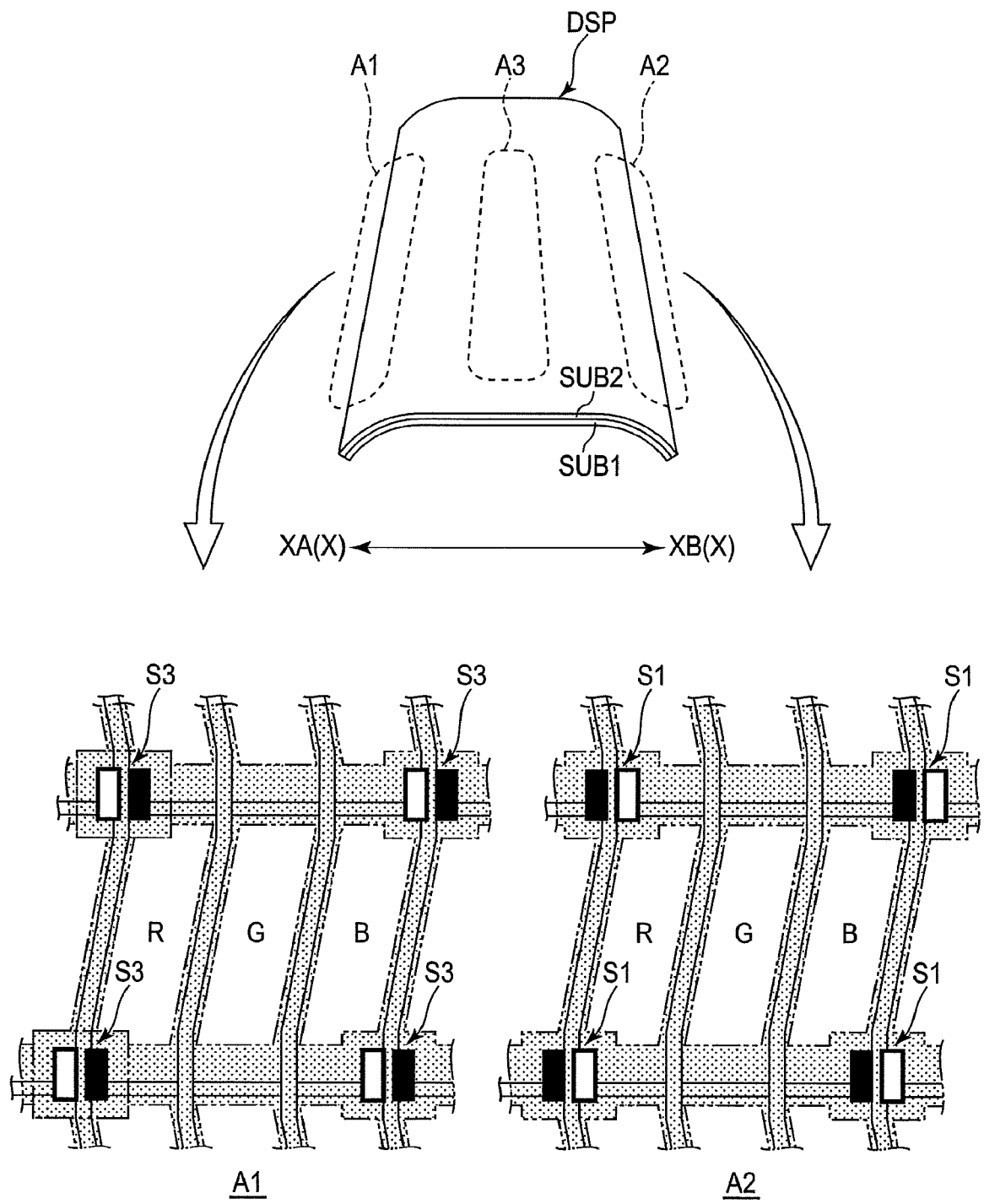
F I G. 14

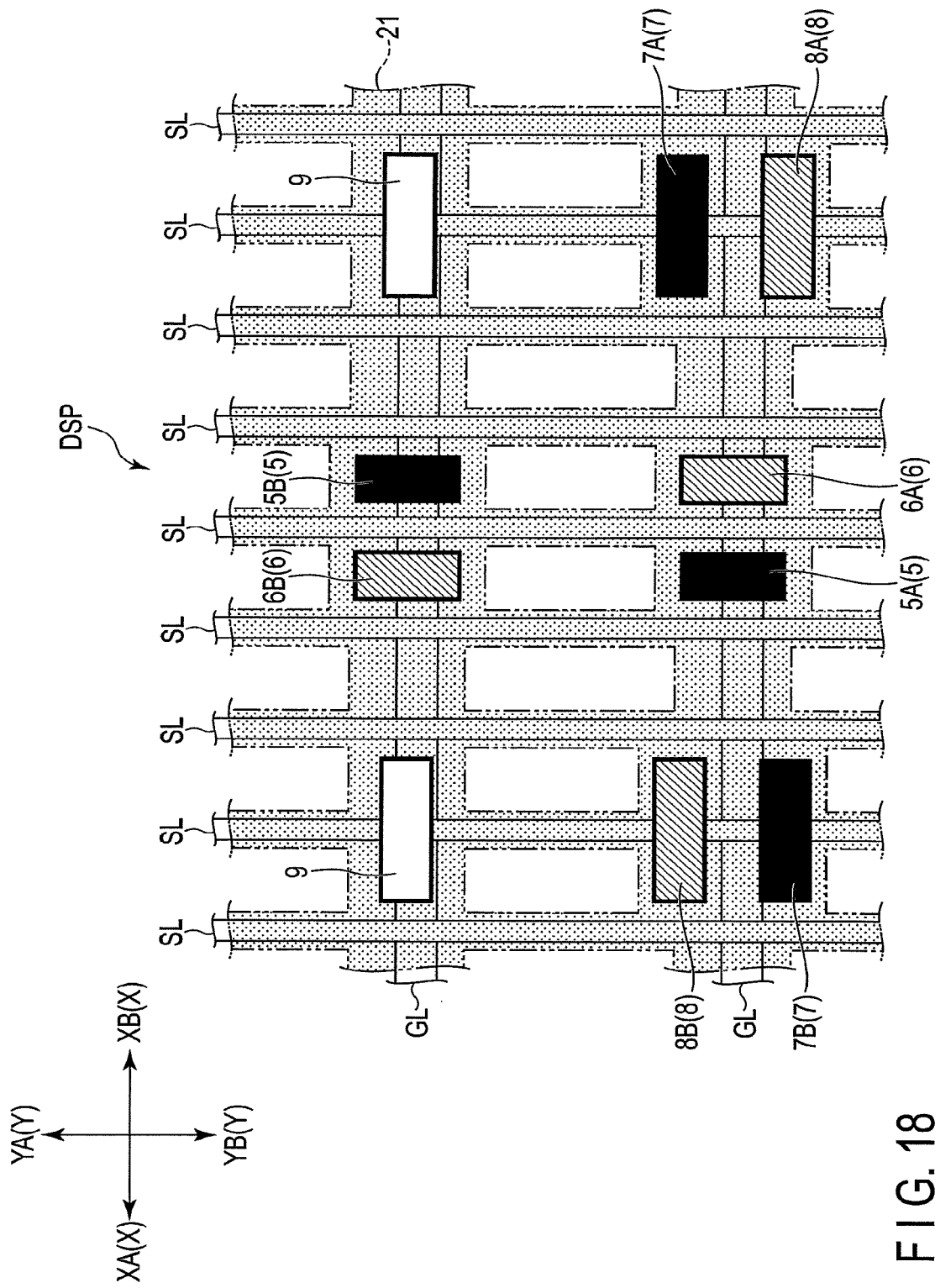
F I G. 18

US 10,831,069 B2

DISPLAY DEVICE

CROSS-REFERENCE TO RELATED APPLICATIONS

This application is based upon and claims the benefit of priority from Japanese Patent Application No. 2017-107018, filed May 30, 2017, the entire contents of which are incorporated herein by reference.

FIELD

Embodiments described herein relate generally to a display device.

BACKGROUND

A liquid crystal display device comprises a pair of substrates aligned and overlapped. When an external force is applied to the substrates, one of the substrates may be displaced from the other substrate. In a display device of a flexible display or the like, displacement tends to occur with a small force since the substrates are bent or extended.

The object of the embodiments is to provide a display device capable of preferably suppressing displacement of a pair of substrates.

BRIEF DESCRIPTION OF THE DRAWINGS

FIG. 4 is a plan view schematically showing an example of an alignment pattern of a spacer shown in FIG. 1.

FIG. 10 is a plan view showing a schematic structure of a display device according to Fourth Embodiment.

FIG. 13 is a cross-sectional view seen along line F13-F13 of FIG. 12.

FIG. 14 is a perspective view showing a schematic structure of a display device according to Sixth Embodiment.

FIG. 18 is a plan view showing a schematic structure of a display device according to Eighth Embodiment.

DETAILED DESCRIPTION

Figure 1:
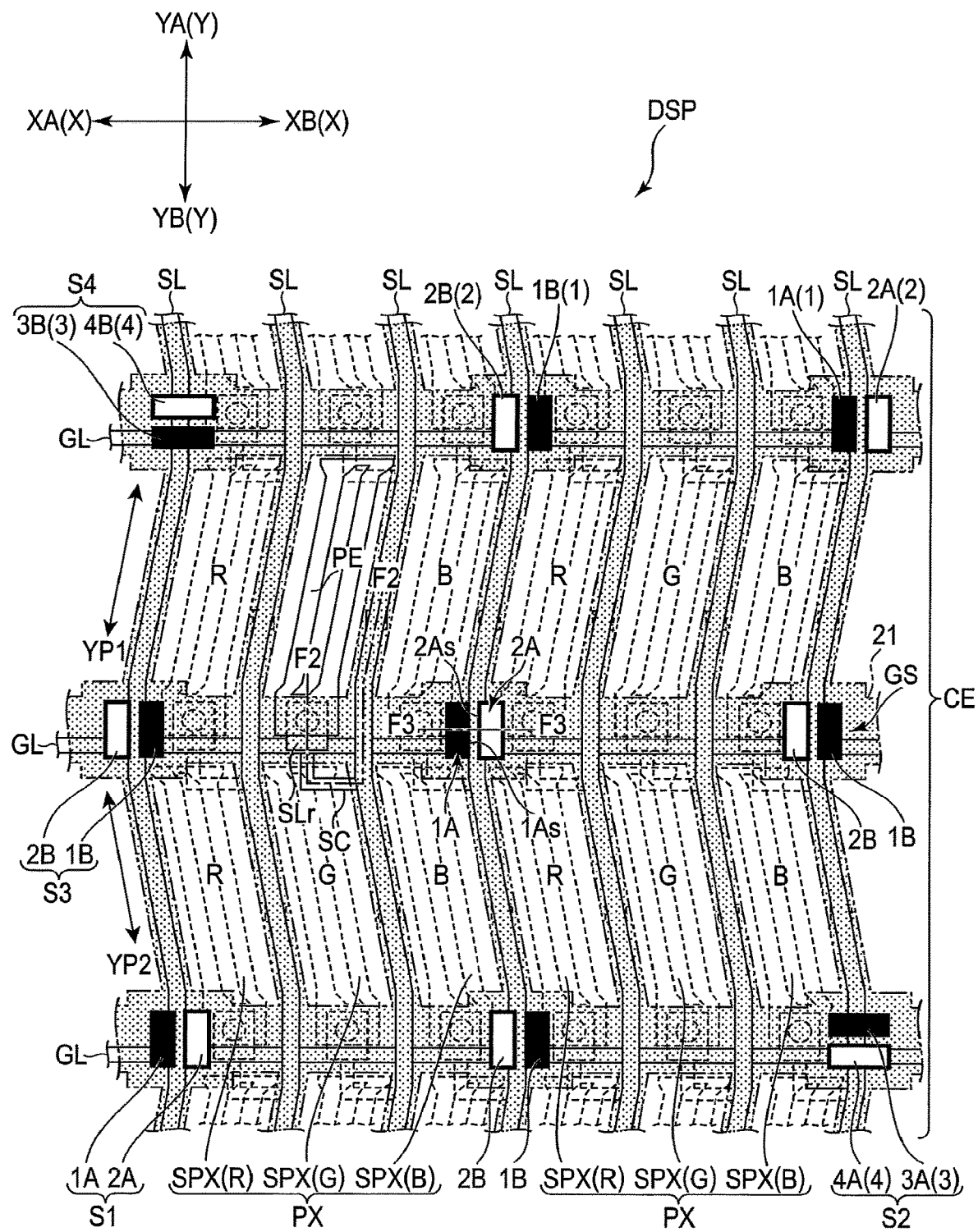
FIG. 1 is a plan view showing a schematic structure of a display device according to First Embodiment.

In general, according to one embodiment, a display device comprises a first A spacer, a second A spacer, a third A spacer and a fourth A spacer. The first A spacer and the third A spacer are on a first substrate. The second A spacer and the fourth A spacer are on a second substrate opposed to the first substrate. At least one of the first substrate and the second substrate is a flexible substrate. The first A spacer and the second A spacer are aligned in a first direction in planar view. The third A spacer and the fourth A spacer are aligned in a second direction intersecting the first direction in planar view. Side surfaces of the first A spacer and the second A spacer face in the first direction. Side surfaces of the third A spacer and the fourth A spacer face in the second direction.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, and the like of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

Furthermore, in this specification, expressions such as "α includes A, B or C", "α includes any one of A, B and C" and "a is selected from a group consisting of A, B and C" do not exclude a case where α includes combinations of A, B and C unless otherwise specified. Still further, these expressions do not exclude a case where α includes other elements.

A display device DSP, which is a liquid crystal display device, will be disclosed as an example of the display device in the following description. The display device DSP can be used in various devices such as smartphones, tablet computers, mobile phones, personal computers, television receivers, in-vehicle devices, game consoles and wearable devices.

First Embodiment

In the following explanations, watching from the display surface to the back surface in the display device DSP is defined as planar view. The display surface of the display device DSP may be a plane or a curved surface. FIG. 1 is a plan view showing a schematic structure of the display device DSP according to First Embodiment.

As shown in FIG. 1, the display device DSP comprises a plurality of scanning signal lines GL, a plurality of scanning signal lines GL, a plurality of sub-pixels SPX, and a plurality of first to fourth spacers 1, 2, 3, and 4. The scanning signal lines GL extend in the first direction X and are arranged in the second direction Y intersecting the first direction X.

The video signal lines SL extend in the second direction Y so as to be arranged in the first direction X. In the example illustrated in FIG. 1, the video signal lines SL extend in the second direction Y while bent in a zigzag shape. The video signal lines SL may be straight lines parallel to the second direction Y or curves meandering in the second direction Y.

In the example illustrated in FIG. 1, the first direction X and the second direction Y are perpendicular to each other. The first direction X includes a first A direction XA and a first B direction XB. In the example illustrated in FIG. 1, the first direction X is the lateral direction, the first A direction XA is the leftward direction, and the first B direction is the rightward direction. Similarly to this, the second direction Y includes a second A direction YA and a second B direction YB. In the example illustrated in FIG. 1, the second direction Y is the longitudinal direction, the second A direction YA is the upward direction, and the second B direction YB is the downward direction.

A sub-pixel SPX corresponds to an area sectioned by two adjacent scanning signal lines GL and two adjacent video signal lines SL. For example, a pixel PX capable of color display can be constituted by combining three sub-pixels SPX corresponding to red (R), green (G), and blue (B). The pixel PX may include the sub-pixel SPX of the other color such as white (W) or include a plurality of sub-pixels SPX of the same color.

A pixel electrode PE is formed in each of the sub-pixels SPX. A common electrode CE extends across the sub-pixel areas SPX. Extension directions YP1 and YP2 of the pixel electrodes PE are parallel to linear portions of the video signal lines SL curved in the zigzag state and are slightly inclined to the second direction Y.

When the extension direction YP1 is inclined to the first A direction XA with respect to the second direction Y, white is visually recognized to be tinged with blue at a deep viewing angle. When the extension direction YP2 is inclined to the first A direction XA with respect to the second direction Y, white is visually recognized to be tinged with yellow at a deep viewing angle. When the extension directions YP1 and YP2 are alternately inclined in the adjacent sub-pixels SPX, the extension directions can mutually compensate for the color difference and improve the viewing angle property.

In FIG. 1, an area represented by two-dot-chained lines corresponds to a light-shielding layer 21 which blocks light. The light-shielding layer 21 overlaps and covers the scanning signal lines GL, the video signal lines SL, and the first to fourth spacers 1, 2, 3, and 4. The first spacer 1 includes a first A spacer 1A and a first B spacer 1B.

Similarly to this, the second spacer 2 includes a second A spacer 2A and a second B spacer 2B, the third spacer 3 includes a third A spacer 3A and a third B spacer 3B, and the fourth spacer 4 includes a fourth A spacer 4A and a fourth B spacer 4B. The first to fourth spacers 1, 2, 3, and 4 will be explained later in detail with reference to FIG. 3 to FIG. 7.

Figure 2:
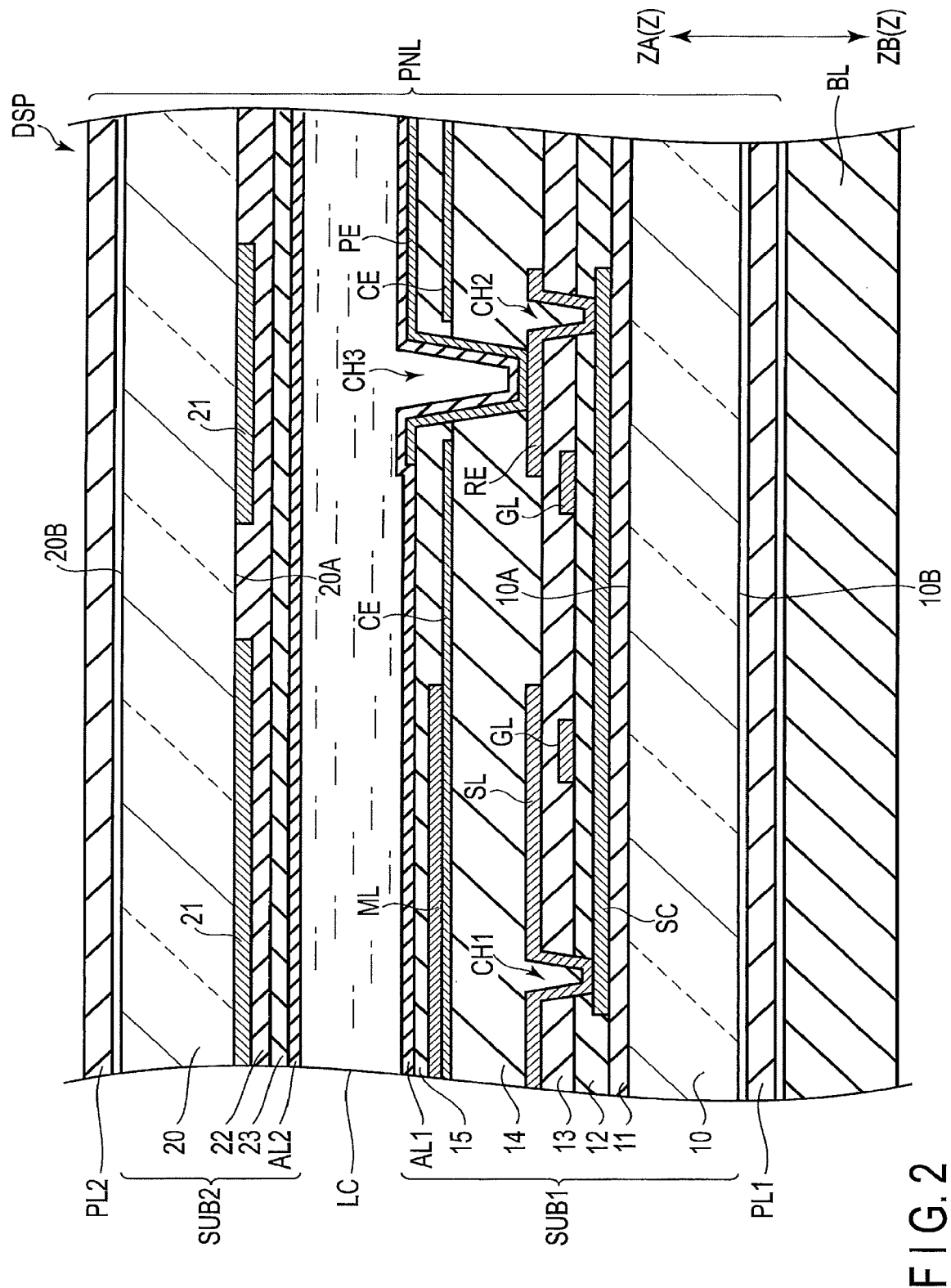
FIG. 2 is a cross-sectional view seen along line F2-F2 of FIG. 1.

FIG. 2 is a cross-sectional view seen along line F2-F2 of FIG. 1. The third direction Z which is the thickness direction of the display device DSP is orthogonal to the first direction X and the second direction Y shown in FIG. 1. In the example illustrated in FIG. 2, the display device DSP is configured to correspond to a display mode mainly using a lateral electric field approximately parallel to the display surface. The display device DSP may be configured to correspond to a display mode using a longitudinal electric field perpendicular to the display surface, an electric field inclined to the display surface, or a combination of the electric fields.

As shown in FIG. 2, the display device DSP comprises a display panel PNL and an illumination device BL which applies light to the back surface of the display panel PNL. The display panel PNL displays an image on the display surface by urging the light incident on the back surface to be transmitted selectively. The display panel PNL may be a reflective display panel which displays an image on the display surface by urging the light incident on the display surface to be reflected selectively.

The display panel PNL comprises a first substrate (array substrate) SUB1, a second substrate (counter-substrate) SUB2 opposed to the first substrate SUB1, and a liquid crystal layer LC disposed between the first substrate SUB1 and the second substrate SUB2. The first substrate SUB1 comprises the scanning signal line GL, the video signal line SL, the pixel electrode PE, and the common electrode CE as shown in FIG. 1. In addition, the first substrate SUB1 further comprises a first flexible base 10, first to fifth insulating layers 11, 12, 13, 14, and 15, a semiconductor layer SC, A relay electrode SLr, and a first alignment film AL1 as shown in FIG. 2.

The first flexible base 10 is formed of, for example, polyimide resin and has flexibility, translucency, and insulation property. The first substrate SUB1 comprising the first flexible base 10 as its base is an example of the flexible substrate. The first flexible base 10 includes a first surface 10A opposed to the second substrate SUB2 and a second surface 10B on a side opposite to the first surface 10A.

A first insulating layer 11 covers the first surface 10A of the first flexible base 10. The semiconductor layer SC is formed on the first insulating layer 11. The second insulating layer 12 covers the first insulating layer 11 and the semiconductor layer SC. The scanning signal lines GL are formed on the second insulating layer 12. The third insulating layer 13 covers the second insulating layer 12 and the scanning signal lines GL.

The video signal line SL and the relay electrode SLr are formed on the third insulating layer 13. The video signal line SL and the relay electrode SLr can be formed in the same steps. The fourth insulating layer 14 covers the third insulating layer 13, the video signal line SL, and the relay electrode SLr. The common electrode CE is formed on the fourth insulating layer 14. A metal layer ML may be formed to overlap the video signal line SL and the scanning signal lines GL. The metal layer ML is electrically connected to the common electrode CE. The fifth insulating layer 15 covers the fourth insulating layer 14, the common electrode CE, and the metal layer ML.

The pixel electrode PE is formed on the fifth insulating layer 15. The pixel electrode PE may be formed under the fifth insulating layer 15, and the common electrode CE may be formed on the fifth insulating layer 15. The fifth insulating layer 15 is an example of an interlayer insulating film which insulates the pixel electrode PE and the common electrode CE from each other. The first alignment film AL1 covers the fifth insulating layer 15 and the pixel electrode PE.

A first contact hole CH1 and a second contact hole CH2 penetrate the second insulating layer 12 and the third insulating layer 13. A third contact hole CH3 penetrates the fourth insulating layer 14 and the fifth insulating layer 15. The video signal line SL is in contact with the semiconductor layer SC through the first contact hole CH1.

The relay electrode SLr is in contact with the semiconductor layer SC through the second contact hole CH2. Either of the video signal line SL and the relay electrode SLr is a source electrode and the other is a drain electrode. A thin-film transistor (TFT) is composed of the semiconductor layer SC, the source electrode, and the drain electrode.

The pixel electrode PE is in contact with the relay electrode SLr through the third contact hole CH3, and is electrically connected to the semiconductor layer SC. When a voltage is supplied to the pixel electrode PE via the source electrode, the electric field is generated between the pixel electrodes PE and the common electrode CE to change the alignment of the liquid crystal molecules of the liquid crystal layer LC. The amount of light transmitted through the liquid crystal layer LC is thereby controlled.

The scanning signal lines GL, the video signal line SL, and the metal layer ML are formed of, for example, a metal material having a single-layer structure or a stacked layer structure. The video signal line SL may be narrower as compared with the scanning signal line GL. The relay electrode SLr is formed of, for example, the same metal material as the video signal line SL. The pixel electrode PE and the common electrode CE are transparent conductive films formed of indium tin oxide (ITO), indium zinc oxide (ILO), and the like.

The semiconductor layer SC is formed of, for example, low temperature polysilicon (LTPS) or high temperature polysilicon (HTPS). The first to third and fifth insulating layers 11, 12, 13, and 15 are inorganic insulating layers of silicon oxide, silicon nitride or alumina.

The fourth insulating layer 14 is, for example, an organic insulating layer formed of photosensitive resin such as acrylic resin. The fourth insulating layer 14 has a function of flattening an uneven surface of the thin-film transistor, and is formed to be thicker than the first to third and fifth insulating layers 11, 12, 13, and 15 and the first alignment film AL1. The fourth insulating layer 14 is an example of a planarizing film.

The second substrate SUB2 comprises a second flexible base 20, a color filter layer 22, an overcoat layer 23, and a second alignment film AL2 in addition to the light-shielding layer 21 shown in FIG. 1. The second flexible base 20 is formed of the same resin material as the first flexible base 10. The second substrate SUB2 comprising the second flexible base 20 as its base is an example of the flexible substrate.

The second flexible base 20 includes a third surface 20A opposed to the first surface 10A of the first flexible base 10, and a fourth surface 20B on the side opposite to the third surface 20A. The light-shielding layer 21 is formed on the third surface 20A of the second flexible base 20. The color filter layer 22 covers the third surface 20A and the light-shielding layer 21. The color filter layer 22 is colored to correspond to each sub-pixel SPX. The overcoat layer 23 covers the color filter layer 22. The second alignment film AL2 covers the overcoat layer 23.

The liquid crystal layer LC is disposed between the first alignment film AL1 and the second alignment film AL2. The first alignment film AL1 and the second alignment film AL2 align the liquid crystal molecules of the liquid crystal layer LC in a state in which a voltage is not applied to the pixel electrodes PE. The first alignment film AL1 and the second alignment film AL2 are, for example, polyimide resin and the like applied by ink jet printing and flexographic printing.

A first polarizer PL1 is applied to the second surface 10B of the first flexible base 10. A second polarizer PL2 is applied to the fourth surface 20B of the second flexible base 20. When an illumination device BL for applying polarized light is employed, the first polarizer PL1 may not be disposed.

The first spacer 1 and the third spacer 3 shown in FIG. 1, i.e., the first A spacer 1A, the first B spacer 1B, the third A spacer 3A, and the third B spacer 3B are formed on the first substrate SUB1. The second spacer 2 and the fourth spacer 4 shown in FIG. 1, i.e., the second A spacer 2A, the second B spacer 2B, the fourth A spacer 4A, and the fourth B spacer 4B are formed on the second substrate SUB2.

The first B spacer 1B, the third A spacer 3A, and the third B spacer 3B have substantially the same shape and function as the first A spacer 1A. For this reason, the first A spacer 1A will be explained in detail as a representative spacer, and duplicate explanations of the first B spacer 1B, the third A spacer 3A, and the third B spacer 3B will be omitted. Similarly, the second B spacer 2B, the fourth A spacer 4A, and the fourth B spacer 4B have substantially the same shape and function as the second A spacer 2A. For this reason, the second A spacer 2A will be explained in detail as a representative spacer, and duplicate explanations of the second B spacer 2B, the fourth A spacer 4A, and the fourth B spacer 4B will be omitted.

Figure 3:
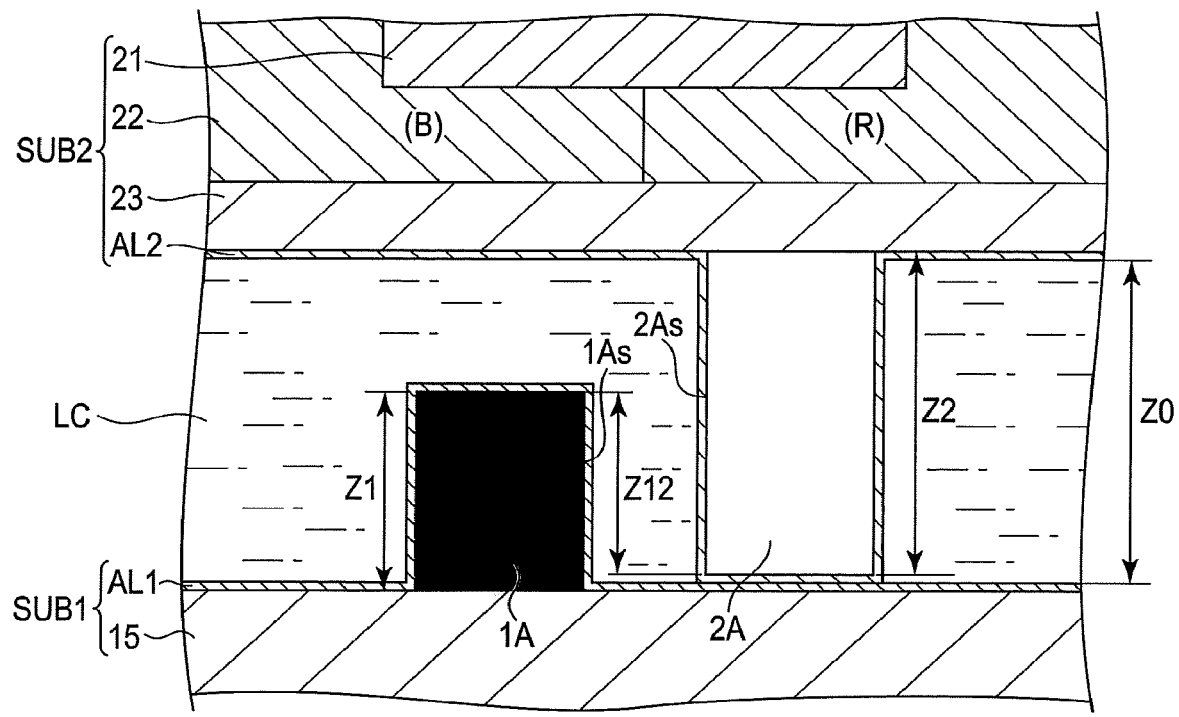
FIG. 3 is a cross-sectional view seen along line F3-F3 of FIG. 1.
Figure 3:
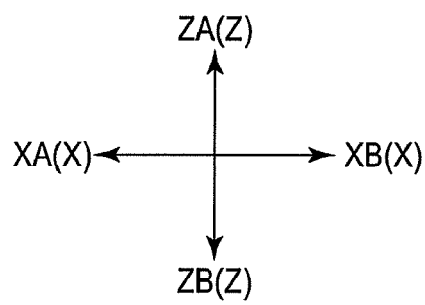

FIG. 3 is a cross-sectional view seen along line F3-F3 of FIG. 1. As shown in FIG. 3, the first A spacer 1A is formed on the fifth insulating layer 15 and covered with the first alignment film AL1. The second A spacer 2A is formed on the overcoat layer 23 and covered with the second alignment film AL2. The first A spacer 1A and the second A spacer 2A are formed of, for example, photosensitive acrylic resin or the like.

The display device DSP according to the First Embodiment and the embodiments explained below has a characteristic that the first A spacer 1A and the second A spacer 2A do not overlap in planar view. A height Z1 of the first A spacer 1A which is disposed not to overlap the second A spacer 2A is not limited by a height Z2 of the second A spacer 2A. The height Z1 of the first A spacer 1A and the height Z2 of the second A spacer 2A can be freely selected within a cell gap Z0 that is the interval between the first substrate SUB1 and the second substrate SUB2.

In the example illustrated in 3, the height Z1 of the first A spacer 1A is formed to be lower than the cell gap Z0 and higher than a half of the cell gap Z0. The height Z2 of the second A spacer 2A is formed to be substantially the same as the cell gap Z0. For this reason, the first A spacer 1A is not in contact with the second substrate SUB2 while the second A spacer 2A is in contact with the first substrate SUB1 via the first alignment film AL1 and the second alignment film AL2. The height Z1 of the first A spacer 1A may be formed to be substantially the same as the cell gap Z0 and the height Z2 of the second A spacer 2A may be formed to be lower than the cell gap Z0.

Side surfaces 1As and 2As of the first A spacer 1A and second A spacer 2A adjacent to each other are opposed to each other in the first direction X. When the second substrate SUB2 is moved from the first substrate SUB1 in the first A direction XA, the side surface 1As of the first A spacer 1A abuts on the side surface 2As of the second A spacer 2A to prevent movement of the second substrate SUB2.

In the configuration of the First Embodiment, a contact area of the side surfaces of the upper and lower spacers can be increased as compared with a configuration that the recess portion is formed at the distal end of the spacer of the second substrate SUB2, the spacer (base) is formed on the first substrate SUB1 to overlap the recess portion, and the side surface of the spacer of the second substrate SUB2 is made to abut on the side surface of the spacer of the first substrate SUB1 to prevent movement of the second substrate SUB2. In the example illustrated in FIG. 3, a contact surface Z12 on which the side surface 1As of the first A spacer 1A is in contact with the side surface 2As of the second A spacer 2A is wider than a half of the cell gap Z0.

FIG. 4 is a plan view schematically showing the first A to fourth B spacers 1A, 1B, 2A, 2B, 3A, 3B, 4A, and 4B shown in FIG. 1. As shown in FIG. 4, the first A spacers 1A and the first B spacers 1B are aligned in the first direction X, and the third A spacers 3A and the third B spacers 3B are aligned in the second direction Y. In the example illustrated in FIG. 4, the first A spacers 1A, the first B spacers 1B, the third A spacers 3A, and the third B spacer 3B are formed in intersection areas GS where the scanning signal lines GL and the video signal lines SL intersect. The spacers may be formed at positions remote from the intersection areas GS.

Each of the second A spacers 2A is disposed to be adjacent to the first A spacer 1A, and each of the second B spacers 2B is disposed to be adjacent to the first B spacer 1B. Each of the fourth A spacers 4A is disposed to be adjacent to the fourth A spacer 4A, and each of the fourth B spacers 4B is disposed to be adjacent to the fourth B spacer 4B.

The first A spacer 1A is located in a first A direction (leftward direction) XA with respect to the adjacent second A spacer 2A. Similarly, the first B spacer 1B is located in a first B direction (rightward direction) XB with respect to the adjacent second B spacer 2B, the third A spacer 3A is located in a second A direction (upward direction) with respect to the adjacent fourth A spacer 4A, and the third B spacer 3B is located in a second B direction (downward direction) with respect to the adjacent fourth B spacer 4B.

In the following explanations, a pair of the first A spacer 1A and the second A spacer 2A adjacent to each other is called a first set S1, a pair of the third A spacer 3A and the fourth A spacer 4A adjacent to each other is called a first set S2, a pair of the first B spacer and the second B spacer adjacent to each other is called a third set S3, and a pair of the third B spacer 3B and the fourth B spacer 4B adjacent to each other is called a fourth set S4.

The first to fourth sets S1, S2, S3, and S4 are examples of stoppers which suppress the displacement of the second substrate SUB2 from the first substrate SUB1. As explained with reference to FIG. 3, the side surfaces 1As and 2As of the first A spacer 1A and second A spacer 2A constituting the first set S1 are opposed to each other in the first direction X.

Similarly, the side surfaces of the third A spacer 3A and third A spacer 4A constituting the second set S2 are opposed to each other in the second direction Y. The side surfaces of the first B spacer 1B and second B spacer 2B constituting the third set S3 are opposed to each other in the first direction X. The side surfaces of the third B spacer 3B and third B spacer 4B constituting the fourth set S4 are opposed to each other in the second direction Y.

Figure 5:
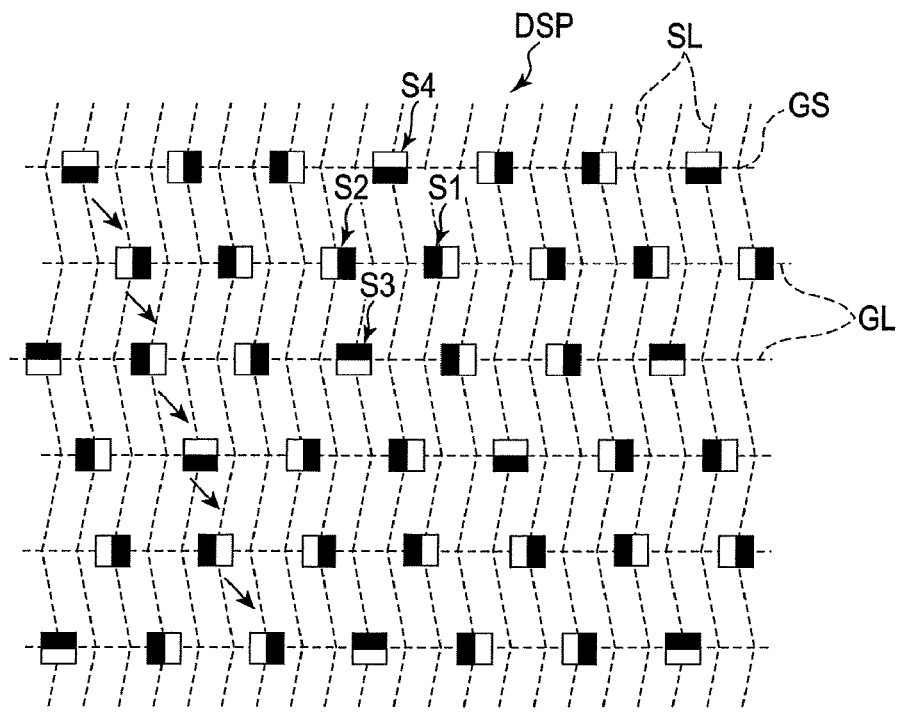
FIG. 5 is a plan view schematically showing another example of the alignment pattern shown in FIG. 4.
Figure 6:
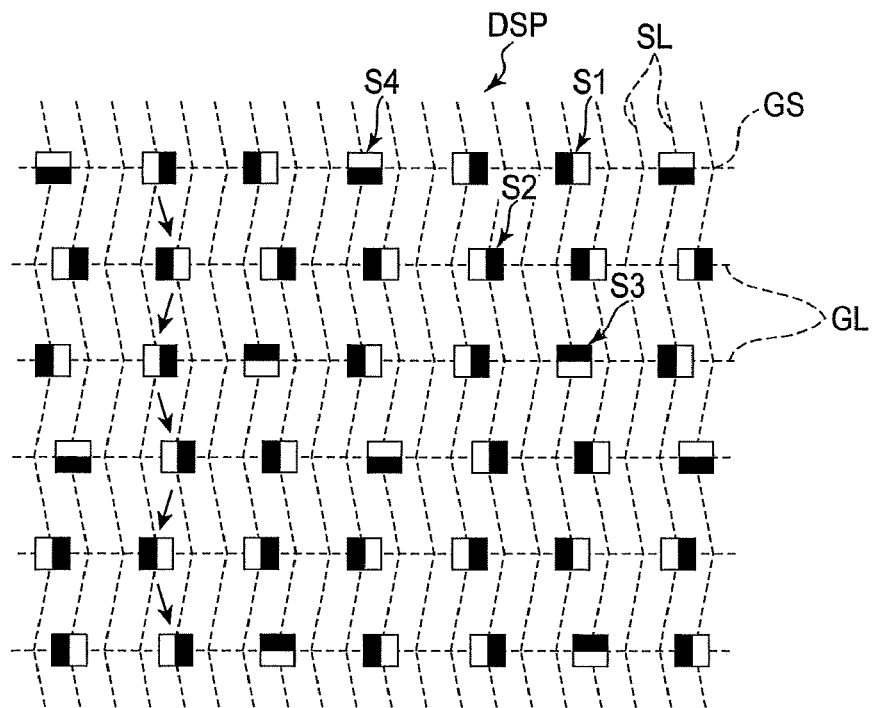
FIG. 6 is a plan view schematically showing yet another example of the alignment pattern shown in FIG. 4 and FIG. 5.
Figure 7:
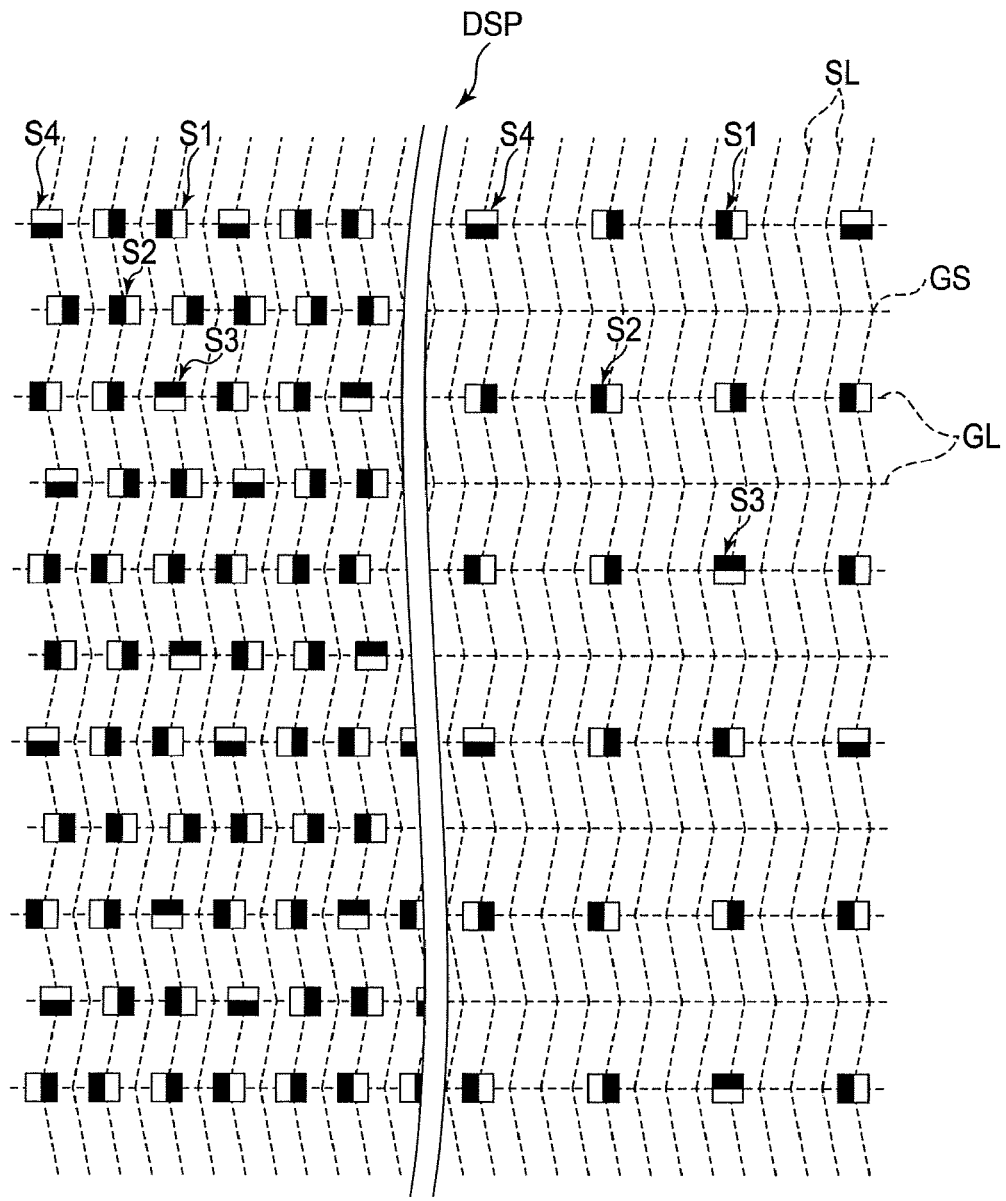
FIG. 7 is a plan view schematically showing yet another example of the alignment pattern shown in FIG. 4, FIG. 5 and FIG. 6.

FIG. 5 to FIG. 7 are plan views schematically showing another example of the alignment pattern of the spacers shown in FIG. 4. In the example illustrated in FIG. 4, the first to fourth sets S1, S2, S3, and S4 are aligned in the intersection areas GS where third, sixth, ninth, . . . 3N video signal lines SL from the left and the scanning signal lines GL intersect. However, the alignment pattern is not limited to this.

As shown in FIG. 5, for example, the first to fourth sets S1, S2, S3, and S4 may be aligned while shifting the video signal line SL to the right adjacent or left adjacent video signal line SL in the second direction YB. As shown in FIG. 6, for example, the first to fourth sets S1, S2, S3, and S4 may be aligned while alternately shifting the video signal lines SL to the even-numbered and odd-numbered video signal lines SL.

As shown in FIG. 7, for example, the first to fourth sets S1, S2, S3, and S4 may be aligned for every two or less video signal lines SL or the first to fourth sets S1, S2, S3, and S4 may be aligned for every four or more video signal lines SL. Density of the first to fourth sets S1, S2, S3, and S4 can be adjusted in accordance with the usage and site of the display device DSP, by combining various alignment patterns.

In the First Embodiment, as shown in FIG. 4 to FIG. 7, the first to fourth sets S1, S2, S3, and S4 are aligned such that the density of the first set S1 and the third set S3 suppressing the displacement in the first direction X is higher than the density of the second set S2 and the fourth set S4 suppressing the displacement in the second direction Y.

In the display device DSP of the First Embodiment constituted as explained above, the spacers are formed in the first substrate SUB1 and the second substrate SUB2, respectively. The spacers (1A, 1B, 3A, and 3B) formed in the first substrate SUB1 and the spacers (2A, 2B, 4A, and 4B) formed in the second substrate SUB2 are arranged adjacently not to overlap in planar view, and constitute the stoppers which suppress the displacement of the second substrate SUB2 from the first substrate SUB1, i.e., the first to fourth sets S1, S2, S3, and S4.

When the second substrate SUB2 is moved from the first substrate SUB1 in the first A direction XA, the side surface 1As of the first A spacer 1A constituting the first set S1 abuts on the side surface 2As of the second A spacer 2A to prevent the movement of the second substrate SUB2, as shown in FIG. 1. When the second substrate SUB2 is moved from the first substrate SUB1 in the opposite direction, i.e., the first A direction XA, the side surface of the first B spacer 1B constituting the third set S3 abuts on the side surface of the second B spacer 2B to prevent the movement of the second substrate SUB2.

When the second substrate SUB2 is moved from the first substrate SUB1 in the second A direction YA, the side surface of the third A spacer 3A constituting the second set S2 abuts on the side surface of the fourth A spacer 4A to prevent the movement of the second substrate SUB2. When the second substrate SUB2 is moved from the first substrate SUB1 in the opposite direction, i.e., the second B direction YB, the side surface of the second B spacer 3B constituting the fourth set S4 abuts on the side surface of the fourth B spacer 4B to prevent the movement of the second substrate SUB2.

According to the First Embodiment, even when the second substrate SUB2 is moved in any one of the first A, first B, second A, and second B directions, the movement of the second substrate SUB2 can be prevented by the spacers constituting the first to fourth sets S1, S2, S3, and S4. The displacement of the second substrate SUB2 from the first substrate SUB1 can be suppressed more effectively and occurrence of color mixture can be suppressed.

A pair of spacers constituting the stopper are disposed not to overlap in planar view. A height of one of the spacers is not limited by a height of the other spacer. Since the height of each of the spacers of the first substrate SUB1 and the second substrate SUB2 can be set freely, the spacer can be formed to have a height enough to suppress the displacement.

If the light-shielding layer 21 is formed to be large in accordance with the displacement, the light applied from the illumination device BL is blocked by the light-shielding layer 21 and the display surface becomes dark. Since the First Embodiment can effectively suppress the displacement, the size of the light-shielding layer 21 can be made smaller. The light applied from the illumination device BL can be used effectively and the power consumption can be saved.

As shown in FIG. 1, in the display device DSP in which the sub-pixels SPX corresponding to red (R), green (G), and blue (B) extend in the second direction Y and are aligned in the first direction X, the displacement in the first direction X gives a greater influence to occurrence of the color mixture and the like than the displacement in the second direction Y. In the First Embodiment, as shown in FIG. 4, the first to fourth sets S1, S2, S3, and S4 are aligned such that the density of the first set S1 and the third set S3 suppressing the displacement in the first direction X is higher than the density of the second set S2 and the fourth set S4 suppressing the displacement in the second direction Y. According to this alignment pattern, the displacement in the first direction X can be suppressed effectively. In addition to the above, various preferable advantages can be obtained from the First Embodiment.

Next, display devices of Second to Ninth Embodiments will be explained with reference to FIG. 8 to FIG. 19. Constituent elements having the same functions as or similar functions to those of the First Embodiment are denoted by the same reference numerals with reference to the descriptions of the First Embodiment, and their explanations will be omitted. In addition, the other constituent elements are the same as those of the First Embodiment.

Second Embodiment

Figure 8:
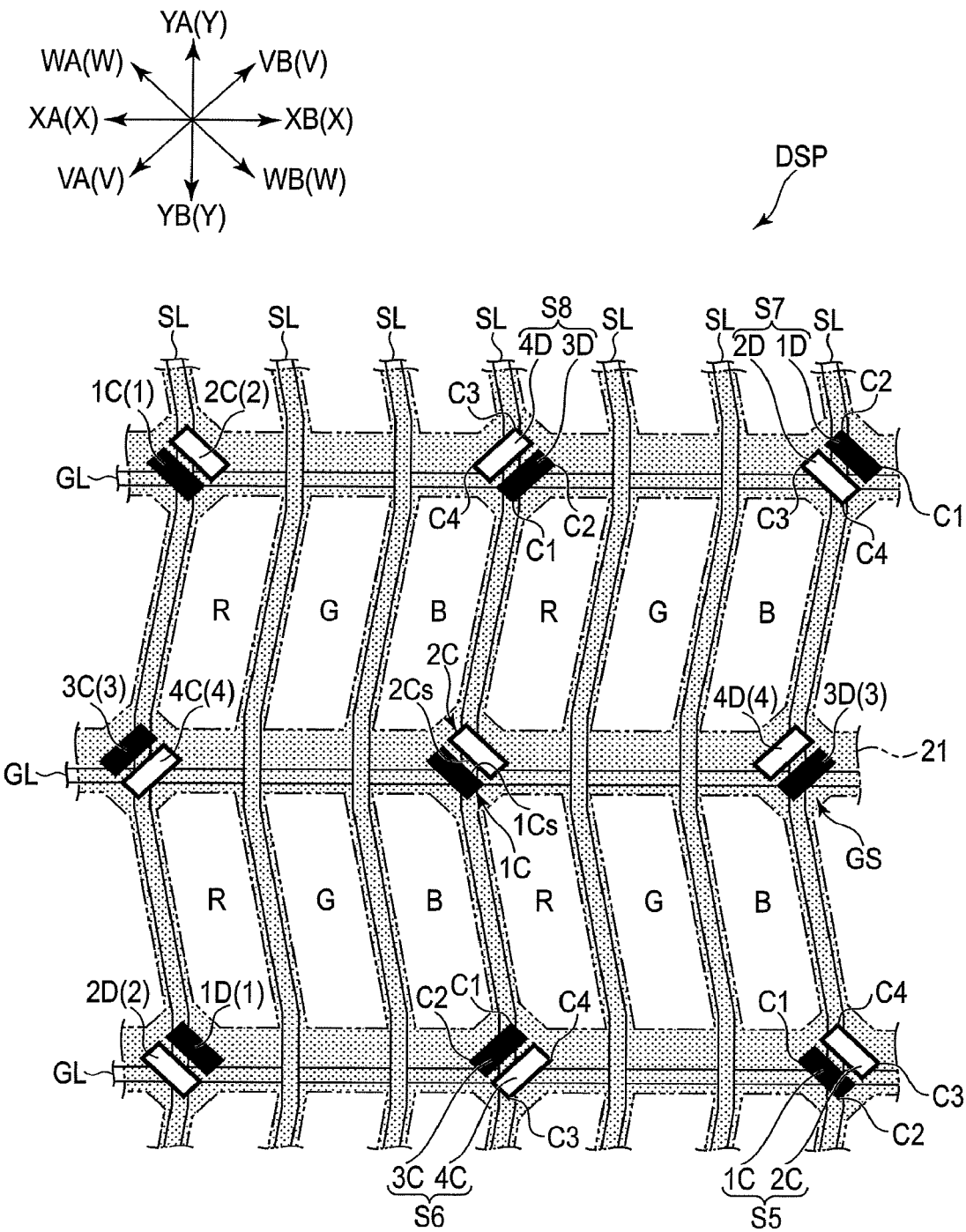
FIG. 8 is a plan view showing a schematic structure of a display device according to Second Embodiment.

FIG. 8 is a plan view showing a schematic structure of a display device DSP according to Second Embodiment. The Second Embodiment is different from the First Embodiment with respect to a feature that first C and fourth D spacers 1C, 1D, 2C, 2D, 3C, 3D, 4C, and 4D are formed instead of the first A to fourth B spacers 1A, 1B, 2A, 2B, 3A, 3B, 4A, and 4B.

Side surfaces of third C and fourth D spacers 3C, 3D, 4C, and 4D exist on the same plane in the first direction X and the second direction Y and extend in a fourth direction V intersecting the first direction X and the second direction Y. Side surfaces of first C and second D spacers 1C, 1D, 2C, and 2D exist on the same plane in the first direction X, the second direction Y, and the fourth direction V and the and extend in a fifth direction W intersecting the first direction X, the second direction Y, and the fourth direction V.

The fourth direction V and the fifth direction W are orthogonal to the third direction (thickness direction) Z shown in FIG. 3. In the example shown in FIG. 8, the fourth direction V is inclined counterclockwise at 45 degrees with respect to the first direction X, and the fifth direction W is inclined counterclockwise at 45 degrees with respect to the second direction Y. The inclination of the fourth direction V for the first direction X and the inclination of the fifth direction W for the second direction Y are arbitrarily set and are not limited to these.

The fourth direction V includes a fourth A direction VA and a fourth B direction VB. In the example illustrated in FIG. 8, the fourth A direction YA is a leftward and downward direction, and the fourth B direction is a rightward and upward direction. Similarly to this, the fifth direction W includes a fifth A direction WA and a fifth B direction WB. In the example illustrated in FIG. 8, the fifth A direction WA is a leftward and upward direction, and the fifth B direction WB is a rightward and downward direction.

In the intersection area GS, the first C spacer 1C extending in the fifth direction W is located in the fourth A direction (leftward and downward direction) VA with respect to the adjacent second C spacer 2C. In other words, side surfaces 1Cs and 1Cs of the first C and second C spacers 1C overlap in the first direction X and also overlap in the second direction Y.

Similarly, in the intersection areas GS, the second D spacer 1D is located in a fourth B direction (rightward and upward direction) VB with respect to the adjacent second D spacer 2D, the third C spacer 2A is located in a fifth A direction (leftward and upward direction) with respect to the adjacent fourth C spacer 4A, and the third D spacer 3D is located in a fifth B direction (rightward and downward direction) with respect to the adjacent fourth D spacer 4D. The side surfaces of the adjacent spacers overlap in the first direction X and also overlap in the second direction Y.

In the following explanations, a pair of the first C spacer 1C and the second C spacer 2C adjacent to each other is called a fifth set S5, a pair of the third C spacer 3C and the fourth C spacer 4C adjacent to each other is called a sixth set S6, a pair of the first D spacer and the second D spacer adjacent to each other is called a seventh set S7, and a pair of the third D spacer 3D and the fourth D spacer 4D adjacent to each other is called an eighth set S8.

The fifth to eighth sets S5, S6, S7, and S8 are formed in an approximately rectangular shape in planar view and include first to fourth corners (four corners) C1, C2, C3, and C4, respectively. In the fifth set S5, the first corner C1 and the third corner C3 that are a pair of opposite angles are disposed side by side in the first direction X, and overlap the light-shielding layer 21 extending along the scanning signal lines GL, in planar view.

The second corner C2 and the fourth corner C4 that are another pair of opposite angles are disposed side by side in the second direction Y, and overlap the light-shielding layer 21 extending along the scanning signal lines GL, in planar view. In the example illustrated in FIG. 8, the second corner C2 and the fourth corner C4 overlap the video signal line SL in planar view.

Similarly, in the sixth set S6, the seventh set S7, and the eighth set S8, a pair of opposite angles are disposed side by side in the first direction X, and overlap the light-shielding layer 21 extending along the scanning signal lines GL, in planar view. Another pair of opposite angles are disposed side by side in the second direction Y, and overlap the light-shielding layer 21 extending along the scanning signal lines GL, in planar view.

As shown in FIG. 8, when the second substrate SUB2 is moved from the first substrate SUB1 in the second A direction YA, the side surface 1Cs of the first C spacer 1C abuts on the side surface 2Cs of the second C spacer 2C, the side surface of the third C spacer 3C abuts on the side surface of the fourth C spacer 4C, and the movement of the second substrate SUB2 is thereby prevented. When the second substrate SUB2 is moved from the first substrate SUB1 in the opposite direction, i.e., the first B direction XB, the side surface of the first D spacer 1D abuts on the side surface of the second D spacer 2D, the side surface of the third D spacer 3D abuts on the side surface of the fourth D spacer 4D, and the movement of the second substrate SUB2 is thereby prevented.

When the second substrate SUB2 is moved from the first substrate SUB1 in the second A direction YA, the side surface of the first D spacer 1D abuts on the side surface of the second D spacer 2D, the side surface of the third C spacer 3C abuts on the side surface of the fourth C spacer 4C, and the movement of the second substrate SUB2 is thereby prevented. When the second substrate SUB2 is moved from the first substrate SUB1 in the opposite direction, i.e., the second B direction YB, the side surface of the first C spacer 1C abuts on the side surface of the second C spacer 2C, the side surface of the third D spacer 3D abuts on the side surface of the fourth D spacer 4D, and the movement of the second substrate SUB2 is thereby prevented.

According to the Second Embodiment, similarly to the First Embodiment, even when the second substrate SUB2 is moved in any one of the first A, first B, second A, and second B directions, the movement of the second substrate SUB2 can be prevented by the spacers constituting the first C to fourth D spacers 1C, 1D, 2C, 2D, 3C, and 3D, and the displacement of the second substrate SUB2 from the first substrate SUB1 can be suppressed effectively.

In the Second Embodiment, four corners C1, C2, C3, and C4 of the fifth to eighth sets S5, S6, S7, and S8 are disposed to overlap the light-shielding layer 21 extending along the video signal line SL or the scanning signal lines GL, in planar view. Since the light-shielding layer 21 extending along the video signal line SL and the scanning signal lines GL can be used at most parts of the light-shielding layer 21 formed to cover the spacers, the size of the light-shielding layer 21 serving as the entire body of the display device DSP can be made smaller. The light applied from the illumination device BL can be used effectively and the power consumption can be saved.

Third Embodiment

Figure 9:
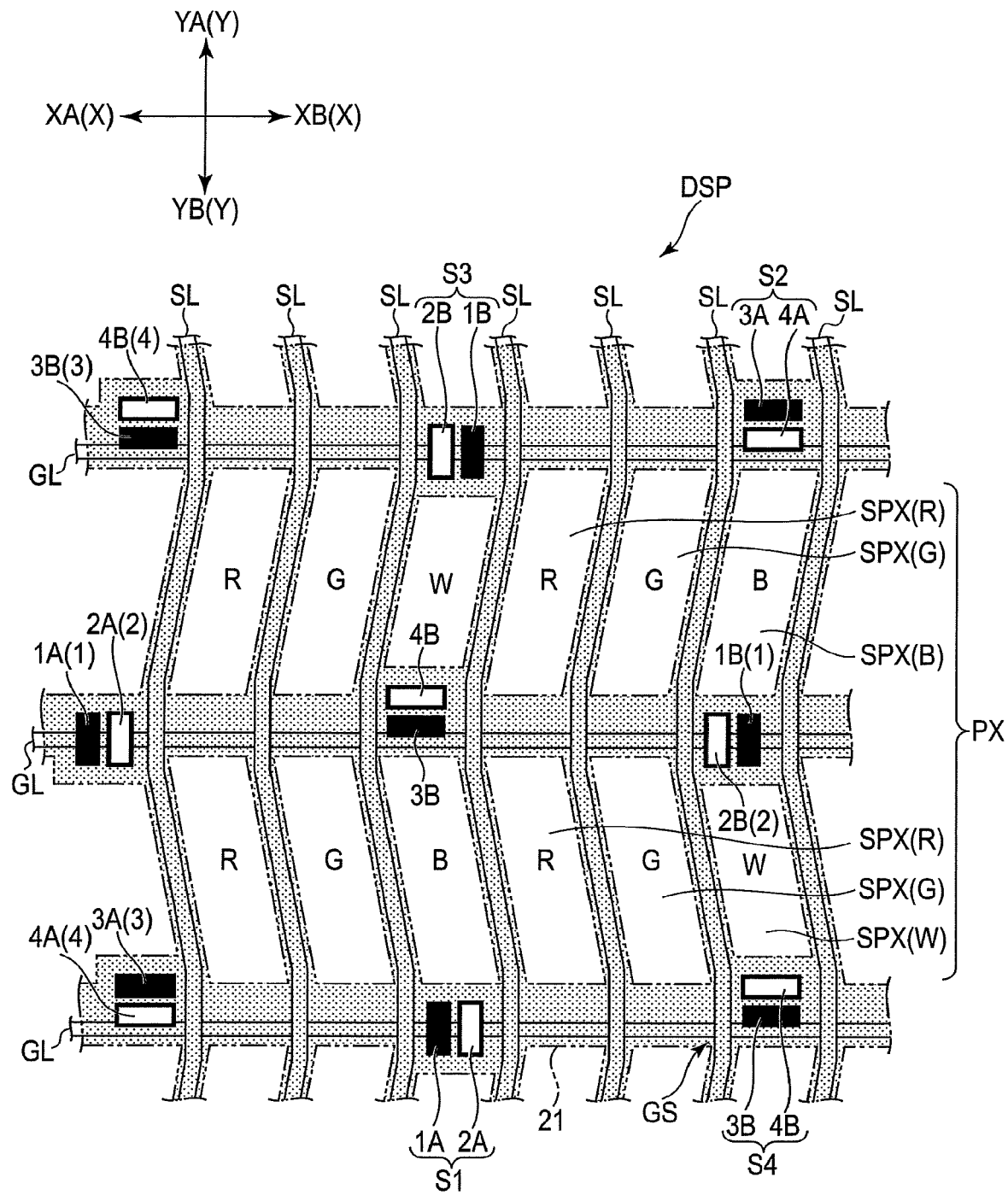
FIG. 9 is a plan view showing a schematic structure of a display device according to Third Embodiment.

FIG. 9 is a plan view showing a schematic structure of a display device DSP according to Third Embodiment. The Third Embodiment is different from the First Embodiment with respect to features that pixels PX further include white (W) sub-pixels SPX, and that first to fourth sets S1, S2, S3, and S4 are disposed to avoid red (R), green (G), and blue (B) sub-pixels SPX and to overlap end portions of the white (W) sub-pixels SPX.

In the example illustrated in FIG. 9, a pixel PX includes two red (R) sub-pixels SPX, two green (G) sub-pixels SPX, one blue (B) sub-pixel SPX, and one white (W) sub-pixel SPX. Combination of the sub-pixels SPX included in the pixel PX is not limited to this example.

The pixel PX may include one red (R) sub-pixels SPX, one green (G) sub-pixel SPX, one blue (B) sub-pixel SPX, and one white (W) sub-pixel SPX, or may include two or more blue (B) sub-pixels SPX, or may three or more red (R) and green (G) sub-pixels SPX. The blue (B) sub-pixel SPX has lower visibility than the green (G) and red (R) sub-pixels SPX. As shown in FIG. 9, the number of the green (G) and red (R) sub-pixels SPX is desirably more than or equal to the number of the blue (B) sub-pixels SPX.

According to the Third Embodiment, similarly to the First Embodiment, the movement of the second substrate SUB2 can be prevented by the spacers constituting the first to fourth sets S1, S2, S3, and S4 and the displacement of the second substrate SUB2 from the first substrate SUB1 can be suppressed effectively. Furthermore, since the Third Embodiment includes the white (W) sub-pixel SPX, a white component generated by the red (R), green (G), and blue (B) sub-pixels SPX can be replaced with the white (W) sub-pixel SPX.

Since the white (W) sub-pixel SPX has a higher light transmittance than the red (R), green (G), and blue (B) sub-pixels SPX, the light applied from the illumination device BL to the display panel PNL can be used efficiently. According to the Third Embodiment, the power consumption of the illumination device BL can be reduced with the same screen luminance, and the screen luminance can be increased and the visibility can be improved with the same power consumption.

However, if the red (R), green (G), and blue (B) sub-pixels SPX displaying not only the white component, but also all colors are hidden by the light-shielding layer 21 and become so much small, a balance in color matching may be damaged. Thus, in the Third Embodiment, the light-shielding layer 21 covering the first to fourth sets S1, S2, S3, and S4 is formed so as to overlap not the red (R), green (G), and blue (B) sub-pixels SPX, but the white (W) sub-pixel SPX in planar view.

According to the Third Embodiment, even if the first to fourth sets S1, S2, S3, and S4 are formed, the red (R), green (G), and blue (B) sub-pixels SPX are not hidden by the light-shielding layer 21 or do not become so much small. Displacement between the substrates can be suppressed while maintaining the balance in color matching and the screen luminance.

Fourth Embodiment

FIG. 10 is a plan view showing a schematic structure of the display device DSP according to Fourth Embodiment. The Fourth Embodiment is different from the First Embodiment with respect to features that several or all parts of a first spacer 1 and a second spacer 2 are replaced with a fifth spacer 5 and a sixth spacer 6 and that several or all parts of a third spacer 3 and a fourth spacer 4 are replaced with a seventh spacer 7 and an eighth spacer 8.

The fifth spacer 5 and the seventh spacer 7 are formed on a first substrate SUB1. The sixth spacer 6 and the eighth spacer 8 are formed on a second substrate SUB2. One of features of the embodiment is that the fifth spacer 5 and the sixth spacer 6 do not overlap in planar view similarly to the first spacer 1 and the second spacer 2. One of features of the embodiment is that the seventh spacer 7 and the eighth spacer 8 do not overlap in planar view similarly to the third spacer 3 and the fourth spacer 4.

The fifth spacer 5 includes a fifth A spacer 5A and a fifth B spacer 5B, the sixth spacer 6 includes a sixth A spacer 6A and a sixth B spacer 6B, the seventh spacer 7 includes a seventh A spacer 7A and a seventh B spacer 7B, and the eighth spacer 8 includes an eighth A spacer 8A and an eighth B spacer 8B.

Figure 11:
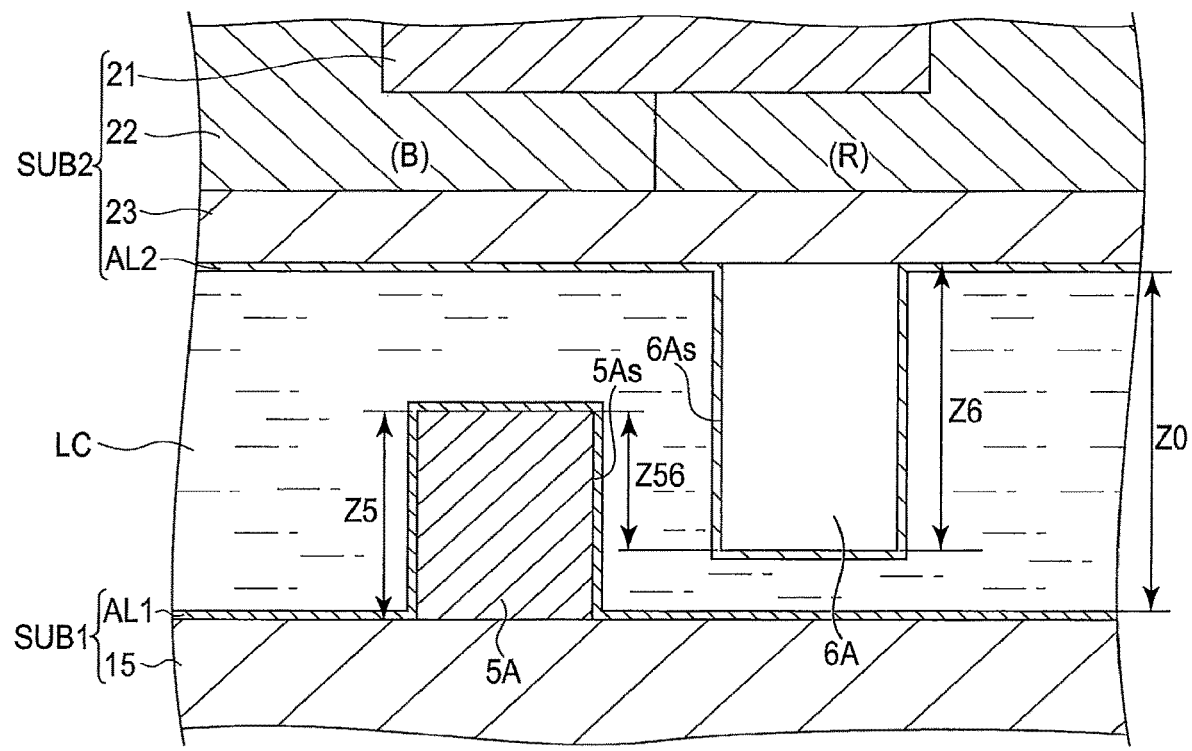
FIG. 11 is a cross-sectional view seen along line F11-F11 of FIG. 10.
Figure 11:
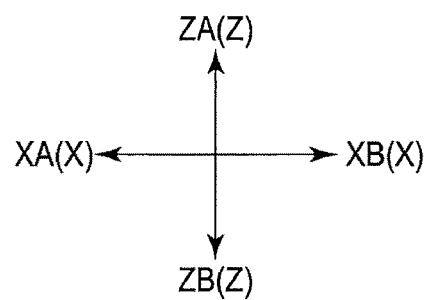

FIG. 11 is a cross-sectional view seen along line F8-F8 of FIG. 10. The fifth A spacer 5A has substantially the same shape and function as the first A spacer 1A shown in FIG. 3 and is aligned similarly to the first A spacer 1A. The sixth A spacer 6A has substantially the same shape and function as the second A spacer 2A shown in FIG. 3 except a height Z6, and is aligned similarly to the second A spacer 2A.

The fifth B spacer 5B, the seventh A spacer 7A, and the seventh B spacer 7B shown in FIG. 10 have substantially the same shape and function as the fifth A spacer 5A shown in FIG. 11, and the sixth B spacer 6B, the eighth A spacer 8A, and the eighth B spacer 8B have substantially the same shape and function as the sixth A spacer 6A. The fifth B spacer 5B is aligned similarly to the first B spacer 1B shown in FIG. 1B, the sixth B spacer 6B is aligned similarly to the second B spacer 2B, the seventh A spacer 7A is aligned similarly to the third A spacer 3A, the seventh B spacer 7B is aligned similarly to the third B spacer 3B, the eighth A spacer BA is aligned similarly to the eighth A spacer 8A, and the eighth B spacer 8B is aligned similarly to the eighth B spacer 8B.

For this reason, the fifth A spacer 5A and the sixth A spacer 6 will be explained in detail as a representative spacers, and duplicate explanations of the fifth B spacer 5B, the sixth B spacer 6B, the seventh A spacer 7A, the seventh A spacer 7A, the seventh B spacer 7B, the eighth A spacer 8A, and the eighth B spacer 8B will be omitted. As shown in FIG. 11, the fifth A spacer 5A is not in contact with the second substrate SUB2, and the sixth A spacer 6A is not in contact with the first substrate SUB1.

At least one of the fifth A spacer 5A and the sixth A spacer 6A is formed to be higher than a half of a cell gap Z0 of the first substrate SUB1 and the second substrate SUB2, and a side surface 5As of the fifth A spacer 5A and a side surface 6As of the sixth A spacer 6A are opposed to each other in the first direction X. When the second substrate SUB2 is moved from the first substrate SUB1 in the first A direction XA, the side surface 5As of the fifth A spacer 5A abuts on the side surface 6As of the sixth A spacer 6A to prevent movement of the second substrate SUB2.

Since the second substrate SUB2 is flatter than the first substrate SUB1 on which the thin-film transistor is formed, the height of the spacers can easily be adjusted. In the example illustrated in FIG. 11, the fifth A spacer 5A is formed to be higher than a half of the cell gap Z0, and the sixth A spacer 6A formed on the second substrate SUB2 is formed to be further higher than the fifth A spacer 5A formed on the first substrate SUB1.

A height Z5 of the fifth A spacer 5A which is disposed not to overlap the sixth A spacer 6A is not limited by a height Z6 of the sixth A spacer 6A. According to the Fourth Embodiment, a contact area of the side surfaces of the upper and lower spacers can be increased as compared with the structure that the recess portion is formed on the tip of the second substrate SUB2 and the spacer (pedestal portion) is formed on the first substrate SUB1 to overlap the recess portion. In the example illustrated in FIG. 11, a contact surface Z56 on which the side surface 5As of the fifth A spacer 5A is in contact with the side surface 6As of the sixth A spacer 6A is wider than a quarter of the cell gap Z0.

The Fourth Embodiment can suppress the displacement between the substrates by the fifth spacer 5, the sixth spacer 6, the seventh spacer 7, and the eighth spacer 8. If an external force is excessively applied after suppression of the displacement, the spacer formed on the second substrate SUB2 may ride on the spacer formed on the first substrate SUB1. If the second spacer 2 having substantially the same height Z2 as the cell gap Z0 rides on the first spacer 1, the cell gap Z0 may be varied greatly and locally and the display quality may be degraded.

In the Fourth Embodiment, at least several parts of the second spacer 2 and the fourth spacer 4 are replaced with the sixth spacer 6 and the eighth spacer 8 lower than the second spacer 2 and the fourth spacer 4. In case the spacer formed on the second substrate SUB2 rides on the spacer formed on the first substrate SUB1, degradation of the display quality can be made inconspicuous by making the variation in the cell gap Z0 smaller.

Fifth Embodiment

Figure 12:
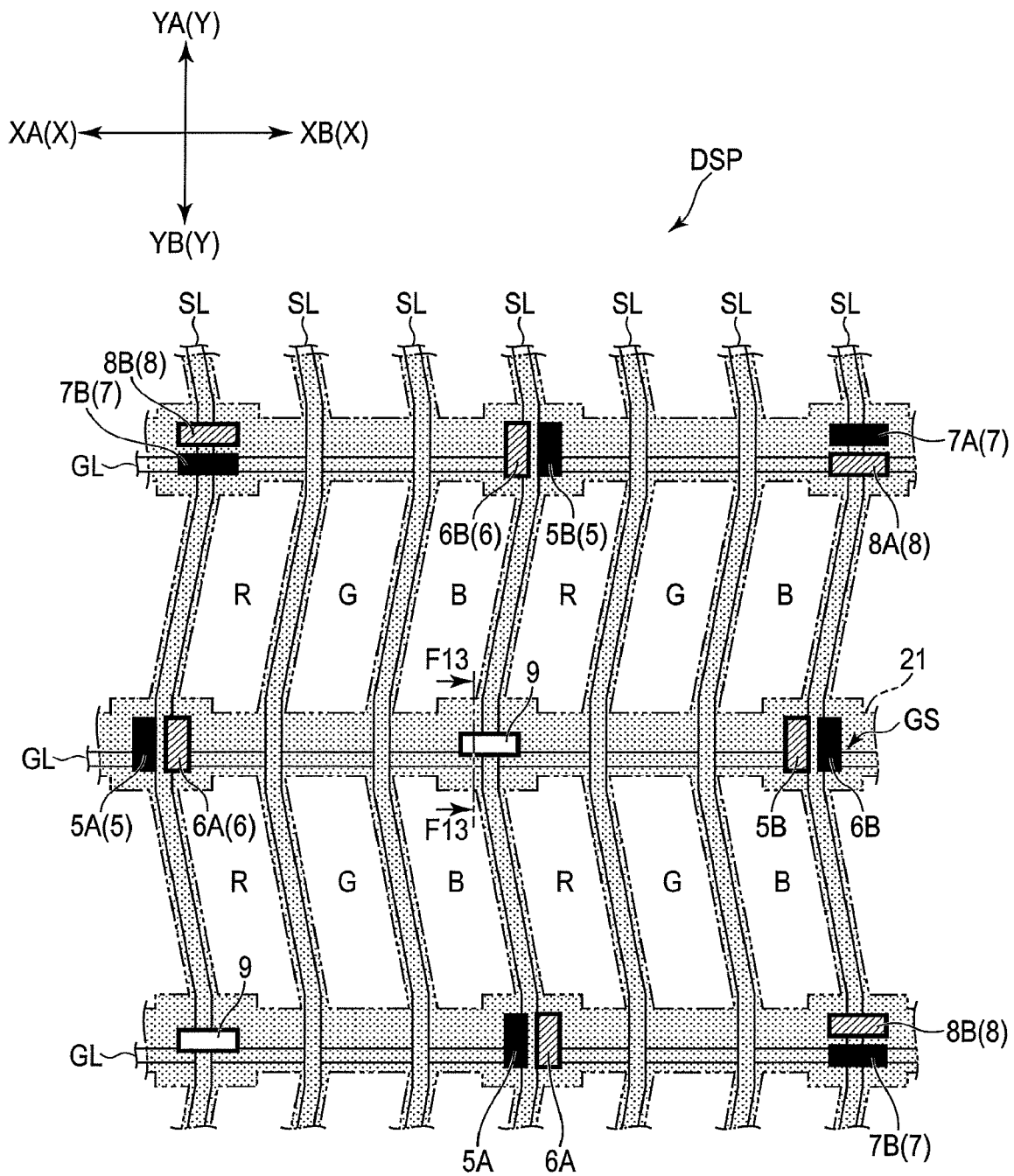
FIG. 12 is a plan view showing a schematic structure of a display device according to Fifth Embodiment.

FIG. 12 is a plan view showing a schematic structure of the display device DSP according to Fifth Embodiment. The Fifth Embodiment is different from the First Embodiment with respect to features that several parts of a third spacer 3 and a fourth spacer 4 are replaced with a ninth spacer 9, that remainders of the third spacer 3 and the fourth spacer 4 are replaced with a seventh spacer 7 and an eighth spacer 8, and that all parts of a first spacer 1 and a second spacer 2 are replaced with a fifth spacer 5 and a sixth spacer 6. In other words, none of the first to fourth spacers 1, 2, 3, and 4 is formed in the Fifth Embodiment.

FIG. 13 is a cross-sectional view seen along line F13-F13 of FIG. 12. As shown in FIG. 13, a height Z9 of the ninth spacer 9 is formed to be substantially the same as a cell gap Z0. In the example illustrated in FIG. 13, the ninth spacer 9 is formed on the second substrate SUB2 and is in contact with the first substrate SUB1 via a first alignment film AL1 and a second alignment film AL2. A surface of the first substrate SUB1 opposed to the ninth spacer 9 rises as compared with the other surface by a video signal line SL, other metal lines, or a fifth insulating layer 15.

The ninth spacer 9 may be formed on the first substrate SUB1 or may be formed on each of the first substrate SUB1 and the second substrate SUB2 to overlap the substrates in planar view. When the ninth spacer 9 is formed in two parts, the height Z9 of the sum of the height of the ninth spacer 9 formed on the first substrate SUB1 and the height of the other ninth spacer 9 formed on the second substrate SUB2 may be substantially the same as the cell gap Z0. The ninth spacer 9 is an example of a conventional spacer which constantly maintains the cell gap Z0.

In the Fifth Embodiment, the displacement of the second substrate SUB2 from the first substrate SUB1 can be suppressed by the fifth spacer 5 and the sixth spacer 6, similarly to the Fourth Embodiment. In the Fifth Embodiment, since none of the first to fourth spacers 1, 2, 3, and 4 is disposed, there is no risk that the second spacer 2 may ride on the first spacer 1, the fourth spacer 4 may ride on the third spacer 3, and the cell gap Z0 may be thereby varied. The cell gap Z0 is maintained constant by not the second spacer 2 or the fourth spacer 4, but the ninth spacer 9.

Sixth Embodiment

FIG. 14 is a plan view showing a schematic structure of the display device DSP according to Sixth Embodiment. The Sixth Embodiment is different from the First Embodiment with respect to a feature that spacers are aligned while varying a density of each of a first set S1 and a third set S3, in an end area (left edge area) A1 of a first A direction XA, an end area (right edge area) A2 of a first B direction XB, and a central area A3 between the end areas A1 and A2.

As shown in FIG. 14, when the end areas A1 and A2 are curved such that a display surface protrudes, a second substrate SUB2 is pulled and a first substrate SUB1 is compressed. In the end area A1 of the first A direction XA, a shearing stress which allows the second substrate SUB2 to move from the first substrate SUB1 in the first B direction XB occurs due to a restoring force of the second substrate SUB2 which is a flexible substrate. Simultaneously, a shearing stress which allows the second substrate SUB2 to move from the first substrate SUB1 in the first A direction XA occurs in the end area A2 of the first B direction XB. In other words, the shearing stress occurs in the opposite directions in the end area A1 and the end area A2.

Figure 15:
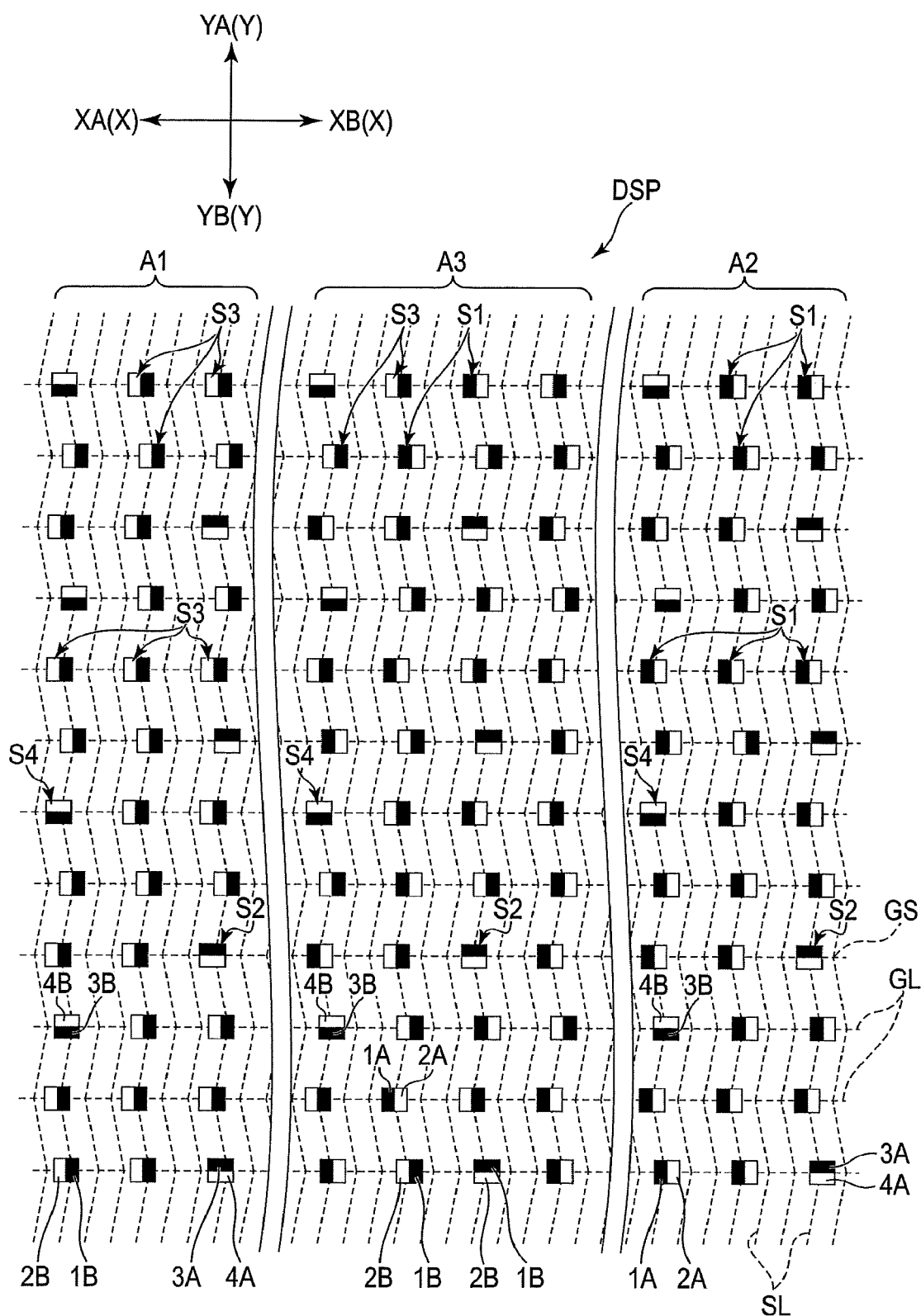
FIG. 15 is a plan view schematically showing density of first and third sets in an end area and a central area shown in FIG. 14.

FIG. 15 is a plan view schematically showing density of the first set S1 and the third set S3 in the end areas A1 and A2 and the central area A3. As shown in FIG. 15, in the Sixth Embodiment, the first set S1 and the third set S3 are aligned such that the density of the third set S3 suppressing the movement of the second substrate SUB2 to the first B direction XB is higher than the density of the first set S1 suppressing the movement in the opposite direction, in the end area A1 which allows the second substrate SUB2 to move in the first B direction XB.

In contrast, the first to fourth sets S1, S2, S3, and S4 are aligned such that the density of the first set S1 suppressing the movement of the second substrate SUB2 to the first A direction XA is higher than the density of the third set S3 suppressing the movement in the opposite direction, in the end area A2 which allows the second substrate SUB2 to move in the first A direction XA.

In the central area A3 between the end areas A1 and A2, the first to fourth sets S1, S2, S3, and S4 are aligned such that the density of the first set S1 is substantially the same as the density of the third set S3. For this reason, the density of the first set S1 is higher in the end area A3 in the first B direction than in the central area A3, and the density of the third set S3 is higher in the end area A1 in the first A direction than in the central area A3.

Since the arrangement pattern is deviated such that stoppers to suppress the movement of the second substrate SUB2 are increased in accordance with the direction of movement of the second substrate SUB2, the Sixth Embodiment can endure a larger stress as compared with a case where the first set S1 and the third set S3 are disposed half-and-half. Even if the bending of the end areas A1 and A3 becomes large, the displacement of the second substrate SUB2 can be suppressed effectively.

Seventh Embodiment

Figure 16:
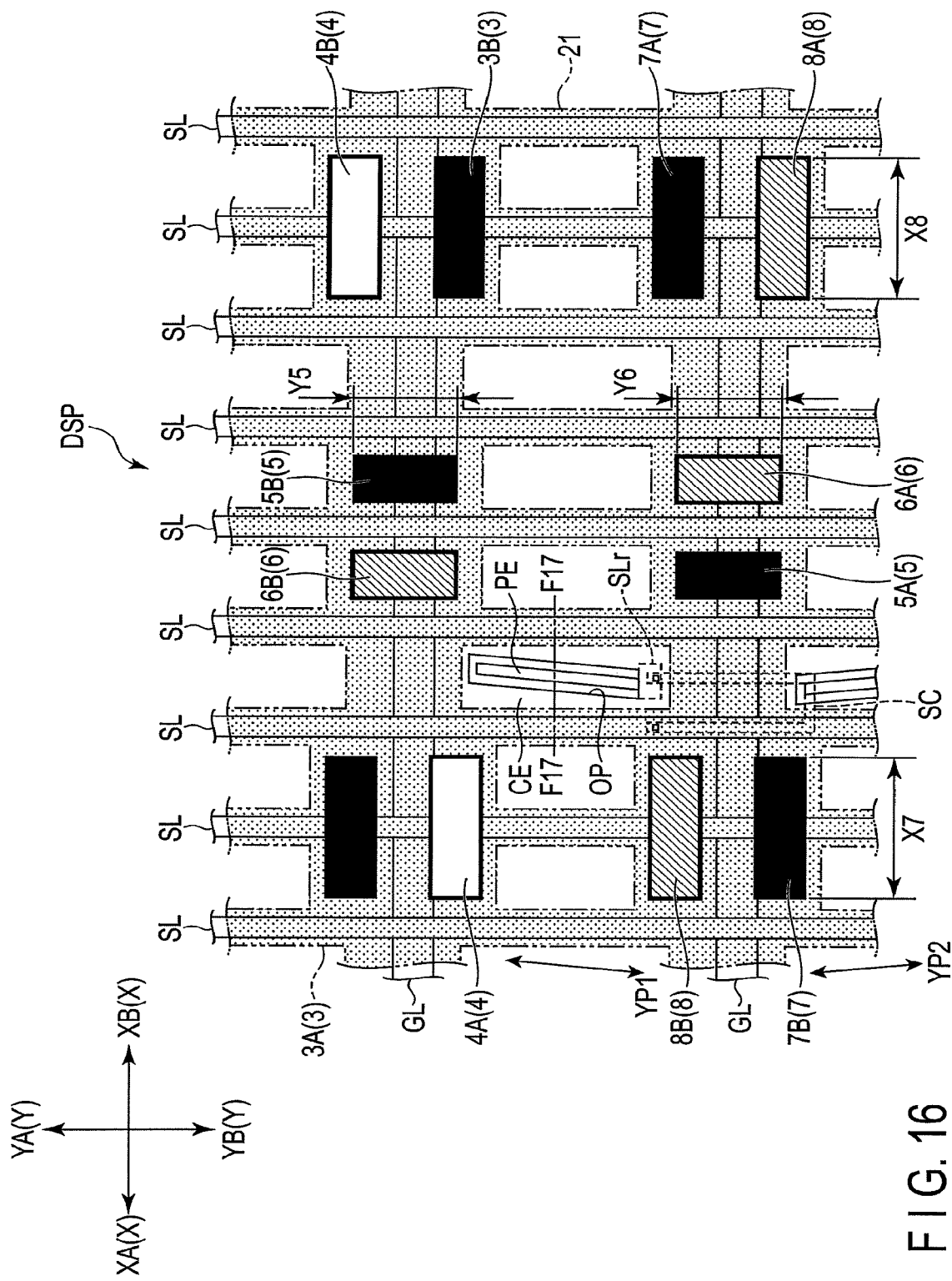
FIG. 16 is a plan view showing a schematic structure of a display device according to Seventh Embodiment.

FIG. 16 is a plan view showing a schematic structure of the display device DSP according to Seventh Embodiment. Seventh Embodiment is, for example, a high-definition display device employed for a head-mounted display or the like. In the example illustrated in FIG. 16, similarly to the Fourth Embodiment, the first to fourth spacers 1, 2, 3, and 4 and the fifth to eighth spacers 5, 6, 7, and 8 are disposed together.

In the example illustrated in FIG. 16, the video signal lines SL are not bent but extend linearly in parallel with the second direction Y. If the video signal lines SL extend linearly, a light-shielding layer 21 covering the video signal lines SL can be formed to have a small width. Extension directions YP1 and YP2 of pixel electrodes PE may be slightly inclined with respect to the second direction Y or may be parallel to the second direction Y.

A common electrode CE includes a slit OP in a sub-pixel SPX. The pixel electrode PE extends in the slit OP. Scanning signal lines GL are formed to be wider than the video signal lines S. For this reason, the light-shielding layer 21 extending along the scanning signal lines GL is wider than the light-shielding layer 21 extending along the video signal lines SL.

The sub-pixels SPX become smaller in accordance with higher definition. Spacers need to be formed in accordance with the sub-pixels SPX but the exposure accuracy is limited. In a case where, for example, the number of pixels is 1000 ppi or more, when the spacers cannot be further narrowed in the width direction, the only length in the extension direction can be adjusted.

In the example illustrated in FIG. 16, a third spacer 3, a fourth spacer 4, a seventh spacer 7, and an eighth spacer 8 extending in the first direction X are disposed to overlap the light-shielding layer 21 extending along the scanning signal lines GL. In contrast, since a fifth spacer 5 and a sixth spacer 6 extending in the second direction Y largely expand over the light-shielding layer 21 extending along the video signal lines SL, the spacers are moved approximately to centers of the sub-pixels SPX in the first direction X and overlap end portions of the sub-pixels SPX.

Even if the spacers become longer in the extension direction, the third spacer 3, the fourth spacer 4, the seventh spacer 7, and the eighth spacer 8 extending along the scanning signal lines GL can use the light-shielding layer 21 extending along the scanning signal lines GL at most parts of the light-shielding layer 21 formed to cover the longer spacers. The area of the sub-pixels SPX hidden by the light-shielding layer 21 covering the spacers is small.

In contrast, when the fifth spacer 5 and the sixth spacer 6 disposed to overlap the end portions of the sub-pixels SPX in planar view become longer in the extension direction, the area of the end portions of the sub-pixels SPX hidden by the light-shielding layer 21 covering the fifth spacer 5 and the sixth spacer 6 is large. Since lengths Y and Y6 of the fifth spacer 5 and the sixth spacer 6 are greatly influenced by the shape of the sub-pixels SPX, the lengths Y5 and Y6 of the fifth spacer 5 and the sixth spacer 6 extending in the second direction Y are formed to be shorter than lengths X7 and X8 of the seventh spacer 7 and the eighth spacer 8 extending in the first direction X, in the example illustrated in FIG. 17.

Figure 17:
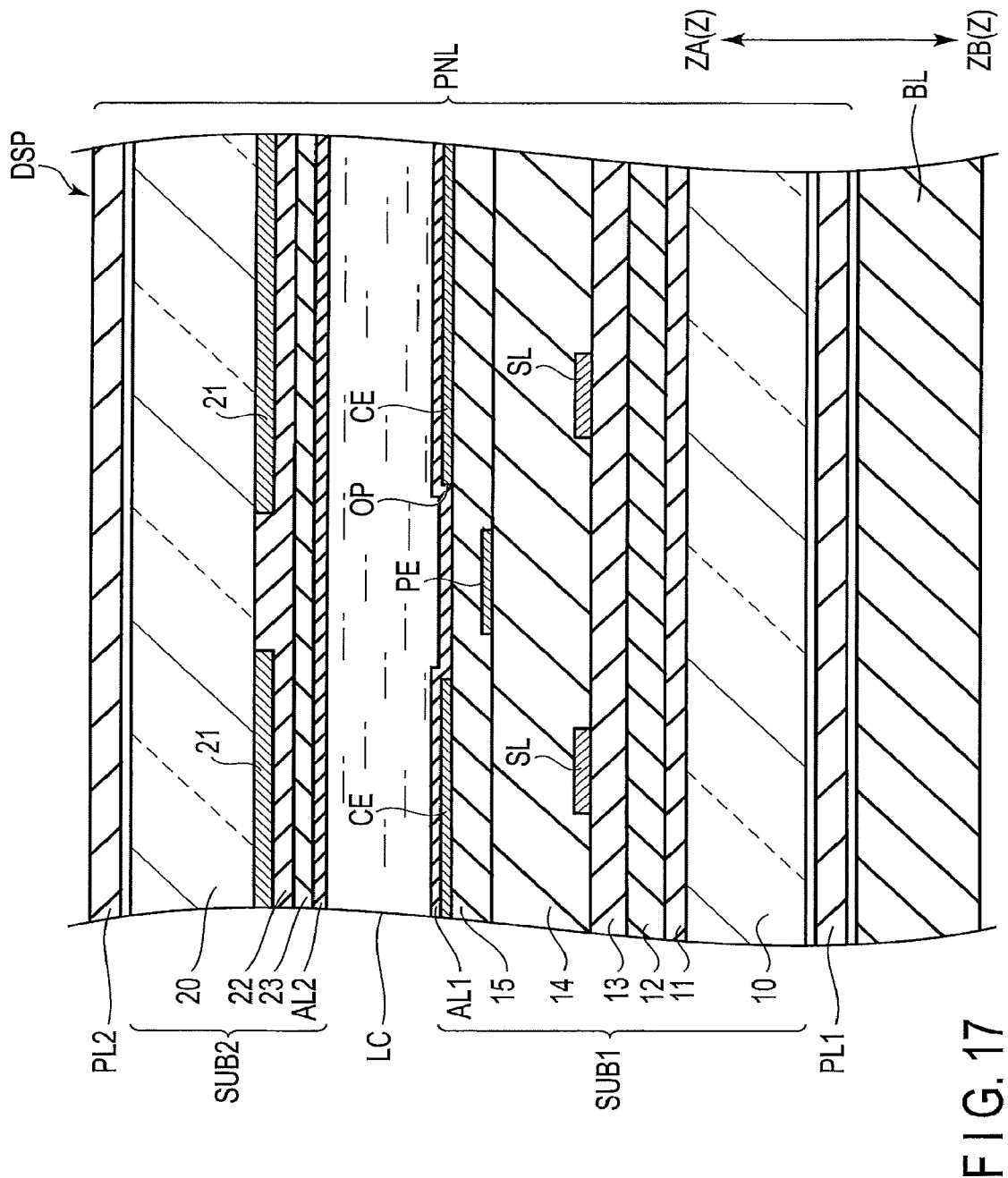
FIG. 17 is a cross-sectional view seen along line F17-F17 of FIG. 16.

FIG. 17 is a cross-sectional view seen along line F13-F13 of FIG. 16. In the example illustrated in FIG. 17, the pixel electrode PE is formed under a fifth insulating layer 15, and the common electrode CE is formed on the fifth insulating layer 15. A material to form the spacers is, for example, photosensitive acrylic resin or the like, and has a small adherence to the fifth insulating layer 15 which is an interlayer insulating film. In the Seventh Embodiment, the spacers are formed to contact the common electrode CE which is a transparent conductive film having a better adherence to the material of the spacers than the fifth insulating layer 15.

According to the Seventh Embodiment, the displacement of the second substrate SUB2 from the first substrate SUB1 can be suppressed by various spacers, similarly to the First Embodiment. The spacers also become smaller in accordance with higher definition. If the spacer size becomes smaller and the area of contact with the base becomes smaller, the spacers may be peeled off when an external force is applied excessively. In the Seventh Embodiment, even if the spacers become smaller, the spacers are formed on the transparent conductive film having a good adherence and the spacers can be firmly adhered to the transparent conductive film.

When the width of the spacers cannot be further smaller due to the limitation of the exposure accuracy, the lengths X7 and X8 of the seventh spacer 7 and the eighth spacer 8 extending in the first direction X are formed to be shorter than the lengths Y5 and Y6 of the fifth spacer 5 and the sixth spacer 6 extending in the second direction Y, in the Seventh Embodiment. According to the Seventh Embodiment, the area of the sub-pixels SPX hidden by the light-shielding layer 21 of the spacers can be minimized and the displacement can be suppressed without sacrificing the screen luminance.

Eighth Embodiment

FIG. 18 is a plan view showing a schematic structure of the display device DSP according to Eighth Embodiment. In the Eighth Embodiment, similarly to the Fifth Embodiment, none of first to fourth spacers 1, 2, 3, and 4 is formed. The other constituent elements are the same as those of the Seventh Embodiment. In the Eighth Embodiment, the displacement of a second substrate SUB2 from a first substrate SUB1 can be suppressed by fifth to sixth spacers 4, 5, 6, and 7, similarly to the Seventh Embodiment.

If an external force is excessively applied, the spacer formed on the second substrate SUB2 may ride on the spacer formed on the first substrate SUB1. If the second spacer 2 having substantially the same height Z2 as the cell gap Z0 rides on the first spacer 1, the cell gap Z0 may be varied greatly and locally and the display quality may be degraded.

In the Eighth Embodiment, since none of the first to fourth spacers 1, 2, 3, and 4 is disposed, there is no risk that the second spacer 2 may ride on the first spacer 1. Simultaneously, there is no risk that the fourth spacer 4 may ride on the third spacer 3. In the Eighth Embodiment, in case the spacer formed on the second substrate SUB2 rides on the spacer formed on the first substrate SUB1, degradation of the display quality can be made inconspicuous by making the variation in the cell gap Z0 smaller.

If the sub-pixels SPX become smaller, the planarizing film such as a fourth insulating layer 14 becomes thinner. If the planarizing film is thinner, protrusion of the video signal lines SL cannot be completely planarized. In a configuration that ninth spacers 9 abut on the video signal lines SL and maintain the cell gap Z0, if the ninth spacers 9 slide down from the protruding video signal lines SL, the cell gap Z0 may be varied.

In the Eighth Embodiment, the ninth spacers 9 extend in the first direction X intersecting the video signal lines SL. If the ninth spacers 9 are long in the first direction X, a risk that the ninth spacer 9 may slide down from the video signal lines SL can be made smaller even if the second substrate SUB2 is slightly displaced in the first direction X.

Ninth Embodiment

Figure 19:
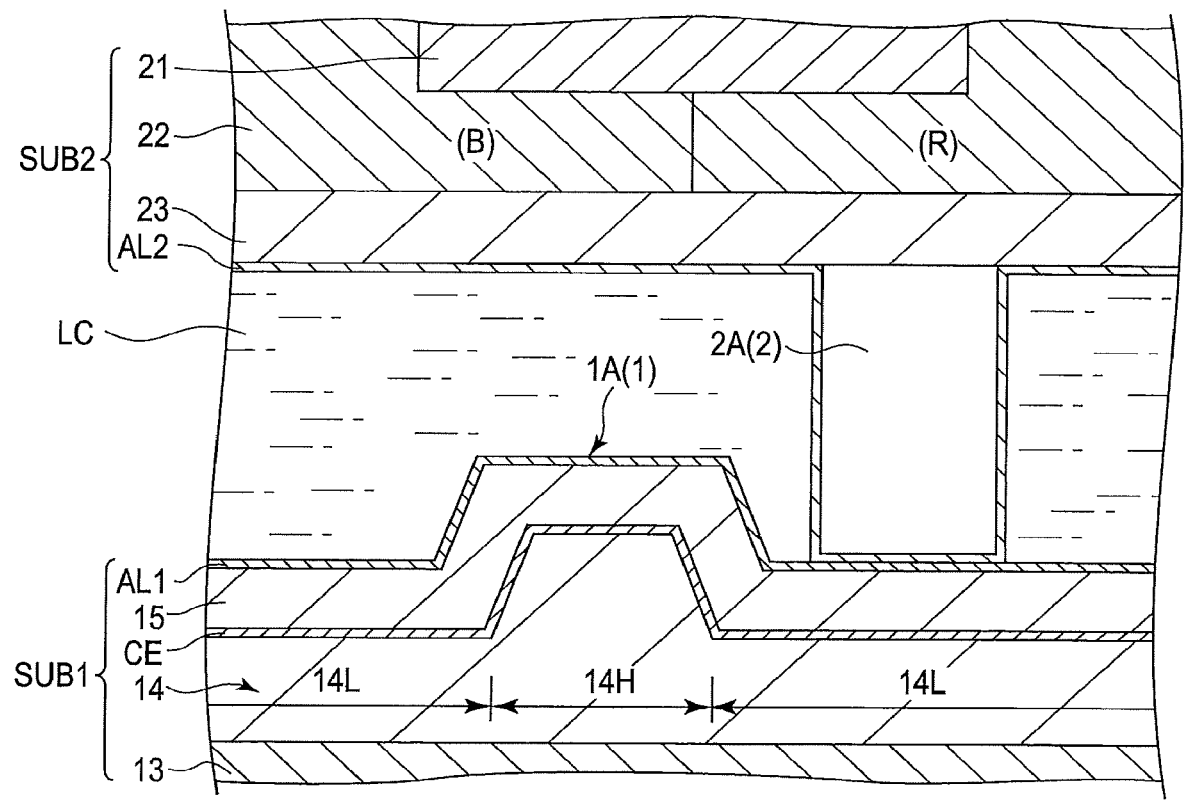
FIG. 19 is a plan view showing a schematic structure of a display device according to Ninth Embodiment.

FIG. 19 is a plan view showing a schematic structure of the display device DSP according to Ninth Embodiment. The display device DSP of the Fourth Embodiment is different from the First Embodiment with respect to a feature that projections and depressions are formed on a planarizing film such as a fourth insulating layer 14 and are constituted as spacers (a first spacer 1, a third spacer 3, a fifth spacer 5, a seventh spacer 7, and the like) of a first substrate SUB1.

To form the projections and depressions on a fourth insulating layer 14, for example, the thickness of the fourth insulating layer 14 may be adjusted for each site by multi-tone processing such as halftone processing. The thickness of the fourth insulating layer 14 at a site 14H which is not subjected to the multi-tone processing is, for example, 3 μm. The thickness of the fourth insulating layer 14 at a site 14L which is subjected to the halftone processing is, for example, 1.5 μm. According to the Ninth Embodiment, the displacement of the second substrate SUB2 from the first substrate SUB1 can be suppressed by various spacers, similarly to the First Embodiment. Furthermore, in the Ninth Embodiment, a step of depositing the spacers on the first substrate SUB1 can be omitted.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, FIG. 1 and FIG. 16 show an example of a double-gate type switching element in which the semiconductor layer SC intersects the scanning signal lines GL at two times, but the switching element may be a single-gate type switching element. For example, FIG. 2 and FIG. 17 show an example that the common electrode CE is provided on the first substrate SUB1, but the common electrode CE may be provided on the second substrate SUB2.

For example, in the Sixth Embodiment, not the end areas in the first A and first B directions, but the end areas in the second A and second B directions may be curved. In this case, the first to fourth sets S1, S2, S3, and S4 may be aligned such that the density of the fourth set S4 is higher than the density of the second set S2 in the end area in the second A direction, and the first to fourth sets S1, S2, S3, and S4 may be aligned such that the density of the second set S2 is higher than the density of the fourth set S4 in the end area in the second B direction.

What is claimed is:

1. A display device, comprising:
scanning signal lines;
video signal lines intersecting the scanning signal lines;
a first A spacer and a third A spacer on a first substrate; and
a second A spacer and a fourth A spacer on a second substrate opposed to the first substrate,
at least one of the first substrate and the second substrate being a flexible substrate,
the first A spacer and the second A spacer being aligned in a first direction in planar view,
the third A spacer and the fourth A spacer being aligned in a second direction intersecting the first direction in planar view,
side surfaces of the first A spacer and the second A spacer facing in the first direction,
side surfaces of the third A spacer and the fourth A spacer facing in the second direction, wherein
one of the first A spacer and the second A spacer is in contact with a substrate on which the other of the first A spacer and the second A spacer is disposed,
the other of the first A spacer and the second A spacer is not in contact with a substrate on which the one of the first A spacer and the second A spacer is disposed,
a pair of the first A spacer and the second A spacer facing each other are disposed at a position corresponding to an intersection area in which the scanning signal lines and the video signal lines intersect, and
a pair of the third A spacer and the fourth A spacer facing each other are disposed at a position corresponding to the intersection area.

2. The display device of claim 1, further comprising:
a first B spacer on the first substrate; and
a second B spacer on the second substrate,
wherein
the first B spacer and the second B spacer are aligned in the first direction in planar view,
the first direction includes a first A direction and a first B direction opposite to the first A direction,
the first A spacer is aligned in the first A direction with respect to the second A spacer, and
the first B spacer is aligned in the first B direction with respect to the second B spacer.

3. The display device of claim 1, further comprising:
a third B spacer on the first substrate; and
a fourth B spacer on the second substrate,
wherein
the third B spacer and the fourth B spacer are aligned in the second direction in planar view, the second direction includes a second A direction and a second B direction opposite to the second A direction,
the third A spacer is aligned in the second A direction with respect to the fourth A spacer, and
the third B spacer is aligned in the second B direction with respect to the fourth B spacer.

4. The display device of claim 1, wherein
the first A spacer and the second A spacer do not overlap.

5. The display device of claim 2, wherein
in the first substrate, an end area in the first A direction and an end area in the first B direction are curved, and
if a pair of the first A spacer and the second A spacer facing each other are set as a first set and if a pair of the first B spacer and the second B spacer facing each other are set as a third set, density of the third set is higher than density of the first set in the end area in the first A direction, and the density of the first set is higher than the density of the third set in the end area in the first B direction.

6. The display device of claim 2, wherein
in the first substrate, an end area in the first B direction is curved, and
if a pair of the first A spacer and the second A spacer facing each other are set as a first set, density of the first set is higher in the end area in the first B direction than a central area.

7. The display device of claim 1, wherein
the scanning signal lines extend in the first direction, and
if a pair of the first A spacer and the second A spacer facing each other are set as a first set and if a pair of the third A spacer and the fourth A spacer facing each other are set as a second set, density of the first set is higher than density of the second set.

8. The display device of claim 1, wherein
the first substrate comprises the scanning signal lines, the video signal lines, and a pixel electrode in a display area,
the first direction is a direction of extension of the scanning signal lines,
the second direction is a direction of extension of the video signal lines, and
a direction of extension of the pixel electrode is inclined to the direction of extension of the video signal lines.

9. The display device of claim 1, further comprising:
a fifth spacer on the first substrate; and
a sixth spacer on the second substrate,
wherein
the fifth spacer and the sixth spacer are aligned in the first direction in planar view,
the fifth spacer is not in contact with the second substrate, and
the sixth spacer is not in contact with the first substrate.

10. A display device, comprising:
scanning signal lines;
video signal lines intersecting the scanning signal lines;
a first A spacer and a third A spacer on a first substrate; and
a second A spacer and a fourth A spacer on a second substrate opposed to the first substrate,
the first A spacer and the second A spacer not overlapping,
the first A spacer and the second A spacer being aligned in a first direction in planar view,
the third A spacer and the fourth A spacer being aligned in a second direction intersecting the first direction in planar view,
side surfaces of the first A spacer and the second A spacer facing in the first direction,
side surfaces of the third A spacer and the fourth A spacer facing in the second direction, wherein
one of the first A spacer and the second A spacer is in contact with a substrate on which the other of the first A spacer and the second A spacer is disposed,
the other of the first A spacer and the second A spacer is not in contact with a substrate on which the one of the first A spacer and the second A spacer is disposed,
a pair of the first A spacer and the second A spacer facing each other are disposed at a position corresponding to an intersection area in which the scanning signal lines and the video signal lines intersect, and
a pair of the third A spacer and the fourth A spacer facing each other are disposed at a position corresponding to the intersection area.

11. The display device of claim 10, wherein
the scanning signal lines extend in the first direction, and
if a pair of the first A spacer and the second A spacer facing each other are set as a first set and if a pair of the third A spacer and the fourth A spacer facing each other are set as a second set, density of the first set is higher than density of the second set.

12. The display device of claim 10, wherein
the first substrate comprises the scanning signal lines, the video signal lines, and a pixel electrode in a display area,
the first direction is a direction of extension of the scanning signal line,
the second direction is a direction of extension of the video signal lines, and
a direction of extension of the pixel electrode is inclined to the direction of extension of the video signal lines.

13. The display device of claim 10, further comprising:
a fifth spacer on the first substrate; and
a sixth spacer on the second substrate,
wherein
the fifth spacer and the sixth spacer are aligned in the first direction in planar view,
the fifth spacer is not in contact with the second substrate, and
the sixth spacer is not in contact with the first substrate.

14. A display device, comprising:
scanning signal lines;
video signal lines intersecting the scanning signal lines;
a first A spacer and a third A spacer on a first substrate;
a second A spacer and a fourth A spacer on a second substrate opposed to the first substrate; and
a transparent conductive film on the first substrate,
the first A spacer and the second A spacer not overlapping,
the first A spacer and the second A spacer being aligned in a first direction in planar view,
the third A spacer and the fourth A spacer being aligned in a second direction intersecting the first direction in planar view,
side surfaces of the first A spacer and the second A spacer facing in the first direction,
side surfaces of the third A spacer and the fourth A spacer facing in the second direction,
the first A spacer and the third A spacer being in contact with the transparent conductive film, wherein
one of the first A spacer and the second A spacer is in contact with a substrate on which the other of the first A spacer and the second A spacer is disposed, and
the other of the first A spacer and the second A spacer is not in contact with a substrate on which the one of the first A spacer and the second A spacer is disposed, a pair of the first A spacer and the second A spacer facing each other are disposed at a position corresponding to an intersection area in which the scanning signal lines and the video signal lines intersect, and a pair of the third A spacer and the fourth A spacer facing each other are disposed at a position corresponding to the intersection area.

15. The display device of claim 14, wherein the scanning signal lines extend in the first direction, and if a pair of the first A spacer and the second A spacer facing each other are set as a first set and if a pair of the third A spacer and the fourth A spacer facing each other are set as a second set, density of the first set is higher than density of the second set.

16. The display device of claim 14, further comprising:

a fifth spacer on the first substrate; and a sixth spacer on the second substrate, wherein the fifth spacer and the sixth spacer are aligned in the first direction in planar view, the fifth spacer is not in contact with the second substrate, and the sixth spacer is not in contact with the first substrate.

* * * * *